(12) United States Patent
David

(10) Patent No.: US 11,418,969 B2
(45) Date of Patent: Aug. 16, 2022

(54) SUGGESTIVE DEVICE CONNECTIVITY PLANNING

(71) Applicant: FISHER-ROSEMOUNT SYSTEMS, INC., Round Rock, TX (US)

(72) Inventor: Clint David, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 17/150,249

(22) Filed: Jan. 15, 2021

(65) Prior Publication Data

US 2022/0232393 A1    Jul. 21, 2022

(51) Int. Cl.
*H04W 16/20* (2009.01)
*H04W 16/18* (2009.01)

(52) U.S. Cl.
CPC .................. *H04W 16/18* (2013.01)

(58) Field of Classification Search
CPC ... H04W 16/20; H04W 84/047; H04W 16/26; H04W 4/40; H04W 4/025; G01C 21/343; G01C 21/3453; G06Q 30/0639; G06Q 10/047; G08G 1/164; G08G 1/096725; G08G 1/096775; G08G 1/205; G08G 1/096716; G05D 1/0287; G05D 2201/0213; G07C 5/008
See application file for complete search history.

(56) References Cited

U.S. PATENT DOCUMENTS

| | | |
|---|---|---|
| RE30,280 E | 5/1980 | Berman et al. |
| 4,316,952 A | 2/1982 | Wendling |
| 4,506,324 A | 3/1985 | Healy |
| 4,512,747 A | 4/1985 | Hitchens et al. |
| 4,546,649 A | 10/1985 | Kantor |

(Continued)

FOREIGN PATENT DOCUMENTS

| | | |
|---|---|---|
| CN | 1561509 A | 1/2005 |
| CN | 1598720 A | 3/2005 |

(Continued)

OTHER PUBLICATIONS

"D1100 SmartMesh Network Release 1.0 Engineering Software Specifications," Dust Networks, Dec. 17, 2011, 36 pages.

(Continued)

*Primary Examiner* — Jung Liu
(74) *Attorney, Agent, or Firm* — Marshall, Gerstein & Borun LLP

(57) ABSTRACT

A network design tool enables users to easily and quickly graphically design a model of a wireless communication network in a process control environment. Specifically, the network design tool may provide an interactive user interface including a canvas that enables users to design network models by way of the users placing and arranging within the canvas symbols representing model devices and links. The tool may dynamically indicate the strengths of communication links at potential locations as the user moves a pointer or cursor around the canvas, and may automatically suggest devices to be added to desired locations. After a desired device has been selected, the tool may automatically connect the selected device to other devices in the model based on an analysis of the plant environment, real-world positions of the existing devices and the new device, and signaling attributes of the existing devices and the new device.

38 Claims, 10 Drawing Sheets

(56) References Cited

U.S. PATENT DOCUMENTS

| | | |
|---|---|---|
| 4,613,952 A | 9/1986 | McClanahan |
| 4,628,435 A | 12/1986 | Tashiro et al. |
| 4,663,704 A | 5/1987 | Jones et al. |
| 4,736,320 A | 4/1988 | Bristol |
| 4,885,717 A | 12/1989 | Beck et al. |
| 4,972,328 A | 11/1990 | Wu et al. |
| 4,977,529 A | 12/1990 | Gregg et al. |
| 5,014,208 A | 5/1991 | Wolfson |
| 5,021,947 A | 6/1991 | Campbell et al. |
| 5,041,964 A | 8/1991 | Cole et al. |
| 5,051,898 A | 9/1991 | Wright et al. |
| 5,079,731 A | 1/1992 | Miller et al. |
| 5,092,449 A | 3/1992 | Bolin et al. |
| 5,097,412 A | 3/1992 | Orimo et al. |
| 5,119,468 A | 6/1992 | Owens |
| 5,159,685 A | 10/1992 | Kung |
| 5,168,441 A | 12/1992 | Onarheim et al. |
| 5,202,985 A | 4/1993 | Goyal |
| 5,218,709 A | 6/1993 | Fijany et al. |
| 5,241,296 A | 8/1993 | Naka et al. |
| 5,268,834 A | 12/1993 | Sanner et al. |
| 5,321,829 A | 6/1994 | Zifferer |
| 5,347,446 A | 9/1994 | Iino et al. |
| 5,347,466 A | 9/1994 | Nichols et al. |
| 5,361,198 A | 11/1994 | Harmon et al. |
| 5,428,555 A | 6/1995 | Starkey et al. |
| 5,485,600 A | 1/1996 | Joseph et al. |
| 5,485,620 A | 1/1996 | Sadre et al. |
| 5,491,625 A | 2/1996 | Pressnall et al. |
| 5,509,116 A | 4/1996 | Hiraga et al. |
| 5,530,643 A | 6/1996 | Hodorowski |
| 5,546,301 A | 8/1996 | Agrawal et al. |
| 5,555,385 A | 9/1996 | Osisek |
| 5,576,946 A | 11/1996 | Bender et al. |
| 5,594,858 A | 1/1997 | Blevins |
| 5,596,704 A | 1/1997 | Geddes et al. |
| 5,603,018 A | 2/1997 | Terada et al. |
| 5,611,059 A | 3/1997 | Benton et al. |
| 5,631,825 A | 5/1997 | van Weele et al. |
| 5,732,192 A | 3/1998 | Malin et al. |
| 5,752,008 A | 5/1998 | Bowling |
| 5,768,119 A | 6/1998 | Havekost et al. |
| 5,796,602 A | 8/1998 | Wellan et al. |
| 5,801,942 A | 9/1998 | Nixon et al. |
| 5,806,053 A | 9/1998 | Tresp et al. |
| 5,812,394 A | 9/1998 | Lewis et al. |
| 5,818,736 A | 10/1998 | Leibold |
| 5,821,934 A | 10/1998 | Kodosky et al. |
| 5,826,060 A | 10/1998 | Santoline et al. |
| 5,828,851 A | 10/1998 | Nixon et al. |
| 5,838,561 A | 11/1998 | Owen |
| 5,838,563 A | 11/1998 | Dove et al. |
| 5,862,052 A | 1/1999 | Nixon et al. |
| 5,889,530 A | 3/1999 | Findlay |
| 5,892,939 A | 4/1999 | Call et al. |
| 5,898,860 A | 4/1999 | Leibold |
| 5,903,455 A | 5/1999 | Sharpe, Jr. et al. |
| 5,909,916 A | 6/1999 | Foster et al. |
| 5,926,531 A | 7/1999 | Petite |
| 5,940,294 A | 8/1999 | Dove |
| 5,950,006 A | 9/1999 | Crater et al. |
| 5,960,214 A | 9/1999 | Sharpe, Jr. et al. |
| 5,970,430 A | 10/1999 | Burns et al. |
| 5,980,078 A | 11/1999 | Krivoshein et al. |
| 5,983,016 A | 11/1999 | Brodsky et al. |
| 5,995,753 A | 11/1999 | Walker |
| 5,995,916 A | 11/1999 | Nixon et al. |
| 6,003,037 A | 12/1999 | Kassabgi et al. |
| 6,023,644 A | 2/2000 | Kinsman |
| 6,028,522 A | 2/2000 | Petite |
| 6,032,208 A | 2/2000 | Nixon et al. |
| 6,041,171 A | 3/2000 | Blaisdell et al. |
| 6,058,260 A | 5/2000 | Brockel et al. |
| 6,069,629 A | 5/2000 | Paterson et al. |
| 6,078,320 A | 6/2000 | Dove et al. |
| 6,094,600 A | 7/2000 | Sharpe, Jr. et al. |
| 6,098,116 A | 8/2000 | Nixon et al. |
| 6,138,174 A | 10/2000 | Keeley |
| 6,146,143 A | 11/2000 | Huston et al. |
| 6,157,864 A | 12/2000 | Schwenke et al. |
| 6,161,051 A | 12/2000 | Hafemann et al. |
| 6,167,316 A | 12/2000 | Gloudeman et al. |
| 6,173,438 B1 | 1/2001 | Kodosky et al. |
| 6,178,393 B1 | 1/2001 | Irvin |
| 6,195,591 B1 | 2/2001 | Nixon et al. |
| 6,201,996 B1 | 3/2001 | Crater et al. |
| 6,218,953 B1 | 4/2001 | Petite |
| 6,233,327 B1 | 5/2001 | Petite |
| 6,236,334 B1 | 5/2001 | Tapperson et al. |
| 6,298,454 B1 | 10/2001 | Schleiss et al. |
| 6,323,882 B1 | 11/2001 | Jerome et al. |
| 6,366,272 B1 | 4/2002 | Rosenberg et al. |
| 6,385,496 B1 | 5/2002 | Irwin et al. |
| 6,415,418 B1 | 7/2002 | McLaughlin et al. |
| 6,430,268 B1 | 8/2002 | Petite |
| 6,437,692 B1 | 8/2002 | Petite et al. |
| 6,442,512 B1 | 8/2002 | Sengupta et al. |
| 6,442,515 B1 | 8/2002 | Varma et al. |
| 6,445,963 B1 | 9/2002 | Blevins et al. |
| 6,449,624 B1 | 9/2002 | Hammack et al. |
| 6,477,435 B1 | 11/2002 | Ryan et al. |
| 6,505,519 B2 | 1/2003 | Henry et al. |
| 6,510,351 B1 | 1/2003 | Blevins et al. |
| 6,515,683 B1 | 2/2003 | Wright |
| 6,522,934 B1 | 2/2003 | Irwin et al. |
| 6,522,974 B2 | 2/2003 | Sitton |
| 6,546,297 B1 | 4/2003 | Gaston et al. |
| 6,577,908 B1 | 6/2003 | Wojsznis et al. |
| 6,587,108 B1 | 7/2003 | Guerlain et al. |
| 6,615,090 B1 | 9/2003 | Blevins et al. |
| 6,618,578 B1 | 9/2003 | Petite |
| 6,618,630 B1 | 9/2003 | Jundt et al. |
| 6,618,745 B2 | 9/2003 | Christensen et al. |
| 6,628,764 B1 | 9/2003 | Petite |
| 6,633,782 B1 | 10/2003 | Schleiss et al. |
| 6,647,315 B1 | 11/2003 | Sherriff et al. |
| 6,684,385 B1 | 1/2004 | 6Ailey et al. |
| 6,687,698 B1 | 2/2004 | Nixon et al. |
| 6,704,737 B1 | 3/2004 | Nixon et al. |
| 6,711,629 B1 | 3/2004 | Christensen et al. |
| 6,747,557 B1 | 6/2004 | Petite et al. |
| 6,754,885 B1 | 6/2004 | Dardinski et al. |
| 6,795,798 B2 | 9/2004 | Eryurek et al. |
| 6,804,636 B2 | 10/2004 | Senta et al. |
| 6,836,737 B2 | 12/2004 | Petite et al. |
| 6,914,533 B2 | 7/2005 | Petite |
| 6,914,893 B2 | 7/2005 | Petite |
| 6,957,110 B2 | 10/2005 | Wewalaarachchi et al. |
| 6,981,424 B2 | 1/2006 | Henry et al. |
| 7,050,083 B2 | 5/2006 | Yoo et al. |
| 7,050,863 B2 | 5/2006 | Mehta et al. |
| 7,053,767 B2 | 5/2006 | Petite et al. |
| 7,065,476 B2 | 6/2006 | Dessureault et al. |
| 7,076,740 B2 | 7/2006 | Santori et al. |
| 7,079,810 B2 | 7/2006 | Petite et al. |
| 7,089,530 B1 | 8/2006 | Dardinski et al. |
| 7,096,465 B1 | 8/2006 | Dardinski et al. |
| 7,103,511 B2 | 9/2006 | Petite |
| 7,110,835 B2 | 9/2006 | Blevins et al. |
| 7,113,834 B2 | 9/2006 | Wojsznis et al. |
| 7,137,550 B1 | 11/2006 | Petite |
| 7,146,231 B2 | 12/2006 | Schleiss et al. |
| 7,209,840 B2 | 4/2007 | Petite et al. |
| 7,219,306 B2 | 5/2007 | Kodosky et al. |
| 7,263,073 B2 | 8/2007 | Petite et al. |
| 7,266,476 B2 | 9/2007 | Coburn et al. |
| 7,272,454 B2 | 9/2007 | Wojsznis et al. |
| 7,275,235 B2 | 9/2007 | Molinari |
| 7,295,128 B2 | 11/2007 | Petite |
| 7,317,959 B2 | 1/2008 | Pfander et al. |
| 7,346,463 B2 | 3/2008 | Petite et al. |
| 7,375,594 B1 | 5/2008 | Lemkin et al. |
| 7,395,122 B2 | 7/2008 | Kreidler et al. |
| 7,397,907 B2 | 7/2008 | Petite |

(56) References Cited

U.S. PATENT DOCUMENTS

| | | |
|---|---|---|
| 7,420,980 B1 | 9/2008 | Pister et al. |
| 7,468,651 B2 | 12/2008 | DeLine et al. |
| 7,468,661 B2 | 12/2008 | Petite et al. |
| 7,502,656 B2 | 3/2009 | Thibault et al. |
| 7,555,471 B2 | 6/2009 | Hogue et al. |
| 7,557,702 B2 | 7/2009 | Eryurek et al. |
| 7,565,215 B2 | 7/2009 | Kolenc et al. |
| 7,593,780 B2 | 9/2009 | Mann et al. |
| 7,613,105 B2 | 11/2009 | Bahl et al. |
| 7,627,860 B2 | 12/2009 | Kodosky et al. |
| 7,647,126 B2 | 1/2010 | Blevins et al. |
| 7,650,425 B2 | 1/2010 | Davis et al. |
| 7,676,154 B2 | 3/2010 | Vukovic et al. |
| 7,697,492 B2 | 4/2010 | Petite |
| 7,743,362 B2 | 6/2010 | Peck et al. |
| 7,836,426 B2 | 11/2010 | Peck et al. |
| 7,865,349 B2 | 1/2011 | Kodosky et al. |
| 7,881,816 B2 | 2/2011 | Mathiesen et al. |
| 7,978,059 B2 | 7/2011 | Petite et al. |
| 8,013,732 B2 | 9/2011 | Petite et al. |
| 8,055,738 B2 | 11/2011 | Shah |
| 8,064,412 B2 | 11/2011 | Petite |
| 8,126,477 B2 | 2/2012 | Dravida et al. |
| 8,135,481 B2 | 3/2012 | Blevins et al. |
| 8,136,088 B2 | 3/2012 | Makowski et al. |
| 8,503,336 B2 | 8/2013 | Rappaport et al. |
| 8,825,183 B2 | 9/2014 | Hammack et al. |
| 8,881,039 B2 | 11/2014 | Hammack |
| 9,046,881 B2 | 6/2015 | Blevins et al. |
| 9,730,078 B2 | 8/2017 | Nixon et al. |
| 10,878,140 B2 | 12/2020 | Snyder |
| 2001/0039462 A1 | 11/2001 | Mendez et al. |
| 2002/0013679 A1 | 1/2002 | Petite |
| 2002/0031101 A1 | 3/2002 | Petite et al. |
| 2002/0042274 A1 | 4/2002 | Ades |
| 2002/0099806 A1 | 7/2002 | Balsamo et al. |
| 2002/0111783 A1 | 8/2002 | Kodosky et al. |
| 2002/0173272 A1 | 11/2002 | Liang et al. |
| 2002/0198668 A1 | 12/2002 | Lull |
| 2003/0063585 A1 | 4/2003 | Younis et al. |
| 2003/0188830 A1 | 10/2003 | Narendrnath et al. |
| 2003/0200062 A1 | 10/2003 | Dessureault et al. |
| 2004/0032433 A1 | 2/2004 | Kodosky et al. |
| 2004/0075689 A1 | 4/2004 | Schleiss et al. |
| 2004/0078182 A1 | 4/2004 | Nixon et al. |
| 2004/0143428 A1 | 7/2004 | Rappaport et al. |
| 2004/0180665 A1 | 9/2004 | Slawitschka et al. |
| 2004/0183687 A1 | 9/2004 | Petite et al. |
| 2004/0214572 A1 | 10/2004 | Thompson et al. |
| 2004/0230582 A1 | 11/2004 | Pagnano et al. |
| 2004/0249483 A1 | 12/2004 | Wojsznis et al. |
| 2005/0062677 A1 | 3/2005 | Nixon et al. |
| 2005/0085928 A1 | 4/2005 | Shani |
| 2005/0091482 A1 | 4/2005 | Gray et al. |
| 2005/0096872 A1 | 5/2005 | Blevins et al. |
| 2005/0136972 A1 | 6/2005 | Smith et al. |
| 2005/0158701 A1 | 7/2005 | West |
| 2005/0164684 A1 | 7/2005 | Chen et al. |
| 2005/0171746 A1 | 8/2005 | Thalhammer-Reyero |
| 2005/0187717 A1 | 8/2005 | Paxson et al. |
| 2005/0197786 A1 | 9/2005 | Kataria et al. |
| 2005/0204028 A1 | 9/2005 | Bahl et al. |
| 2005/0213612 A1 | 9/2005 | Pister et al. |
| 2005/0240386 A1 | 10/2005 | Carballo et al. |
| 2005/0257195 A1 | 11/2005 | Morrow et al. |
| 2005/0276233 A1 | 12/2005 | Shepard et al. |
| 2006/0029060 A1 | 2/2006 | Pister |
| 2006/0029061 A1 | 2/2006 | Pister et al. |
| 2006/0073013 A1 | 4/2006 | Emigholz et al. |
| 2006/0083186 A1 | 4/2006 | Handforth et al. |
| 2006/0106477 A1 | 5/2006 | Miyashita |
| 2006/0133285 A1 | 6/2006 | Tantsis et al. |
| 2006/0159020 A1 | 7/2006 | Porat |
| 2006/0259163 A1 | 11/2006 | Hsiung et al. |
| 2006/0276195 A1 | 12/2006 | Nordling |
| 2007/0038321 A1 | 2/2007 | McDonald et al. |
| 2007/0054670 A1 | 3/2007 | Kalika et al. |
| 2007/0059838 A1 | 3/2007 | Morrison et al. |
| 2007/0078529 A1 | 4/2007 | Thiele et al. |
| 2007/0129917 A1 | 6/2007 | Blevins et al. |
| 2007/0132779 A1 | 6/2007 | Gilbert et al. |
| 2007/0156264 A1 | 7/2007 | Schleiss et al. |
| 2007/0160000 A1 | 7/2007 | Dobrowski et al. |
| 2007/0161367 A1 | 7/2007 | Dobrowski et al. |
| 2007/0161371 A1 | 7/2007 | Dobrowski et al. |
| 2007/0162669 A1 | 7/2007 | Martin et al. |
| 2007/0169047 A1 | 7/2007 | Na et al. |
| 2007/0237081 A1 | 10/2007 | Kodialam et al. |
| 2007/0280287 A1 | 12/2007 | Samudrala et al. |
| 2008/0027704 A1 | 1/2008 | Kephart et al. |
| 2008/0037442 A1 | 2/2008 | Bill |
| 2008/0037482 A1 | 2/2008 | Douglas et al. |
| 2008/0192713 A1 | 8/2008 | Mighani et al. |
| 2008/0249641 A1 | 10/2008 | Enver et al. |
| 2008/0273486 A1 | 11/2008 | Pratt et al. |
| 2008/0273518 A1 | 11/2008 | Pratt et al. |
| 2008/0274766 A1 | 11/2008 | Pratt et al. |
| 2008/0279155 A1 | 11/2008 | Pratt, Jr. et al. |
| 2008/0279204 A1 | 11/2008 | Pratt, Jr. et al. |
| 2008/0285582 A1 | 11/2008 | Pister et al. |
| 2008/0288089 A1 | 11/2008 | Pettus et al. |
| 2009/0010203 A1 | 1/2009 | Pratt, Jr. et al. |
| 2009/0010204 A1 | 1/2009 | Pratt, Jr. et al. |
| 2009/0010205 A1 | 1/2009 | Pratt, Jr. et al. |
| 2009/0010233 A1 | 1/2009 | Pratt, Jr. et al. |
| 2009/0046675 A1 | 2/2009 | Pratt, Jr. et al. |
| 2009/0046732 A1 | 2/2009 | Pratt, Jr. et al. |
| 2009/0052429 A1 | 2/2009 | Pratt, Jr. et al. |
| 2009/0054033 A1 | 2/2009 | Pratt, Jr. et al. |
| 2009/0068947 A1 | 3/2009 | Petite |
| 2009/0210814 A1 | 8/2009 | Agrusa et al. |
| 2009/0222752 A1 | 9/2009 | Wall et al. |
| 2009/0287321 A1 | 11/2009 | Lucas et al. |
| 2009/0292514 A1 | 11/2009 | McKim et al. |
| 2009/0315699 A1 | 12/2009 | Satish et al. |
| 2010/0110916 A1 | 5/2010 | Pratt, Jr. et al. |
| 2010/0194582 A1 | 8/2010 | Petite |
| 2010/0251255 A1 | 9/2010 | Miyamoto et al. |
| 2010/0312881 A1 | 12/2010 | Davis et al. |
| 2011/0040390 A1 | 2/2011 | Blevins et al. |
| 2011/0071651 A1 | 3/2011 | Law et al. |
| 2011/0191500 A1 | 8/2011 | Odayappan et al. |
| 2011/0216656 A1 | 9/2011 | Pratt, Jr. et al. |
| 2011/0264324 A1 | 10/2011 | Petite et al. |
| 2011/0302635 A1 | 12/2011 | Pratt, Jr. et al. |
| 2011/0309953 A1 | 12/2011 | Petite et al. |
| 2011/0320050 A1 | 12/2011 | Petite et al. |
| 2012/0101797 A1 | 4/2012 | Rappaport et al. |
| 2012/0179276 A1 | 7/2012 | Kolenc |
| 2012/0253479 A1 | 10/2012 | Radi |
| 2012/0290107 A1 | 11/2012 | Carlson |
| 2013/0073062 A1 | 3/2013 | Smith |
| 2013/0191106 A1 | 7/2013 | Kephart |
| 2014/0039656 A1 | 2/2014 | Humped |
| 2014/0047417 A1 | 2/2014 | Kaasila |
| 2014/0163724 A1 | 6/2014 | Drebinger |
| 2014/0257526 A1 | 9/2014 | Tiwari |
| 2015/0106066 A1 | 4/2015 | Boys |
| 2015/0106067 A1 | 4/2015 | Boys |
| 2015/0106068 A1 | 4/2015 | Boys |
| 2015/0106073 A1 | 4/2015 | Boys |
| 2015/0106075 A1 | 4/2015 | Boys |
| 2015/0178422 A1 | 6/2015 | McKim et al. |
| 2015/0261200 A1 | 9/2015 | Blevins et al. |
| 2016/0033952 A1 | 2/2016 | Schroeter |
| 2016/0132538 A1 | 5/2016 | Bliss |
| 2016/0132595 A1 | 5/2016 | Bliss |
| 2016/0313751 A1 | 10/2016 | Risbeck |
| 2016/0313752 A1 | 10/2016 | Przybylski |
| 2017/0371984 A1 | 12/2017 | Eliseeva |

(56) References Cited

U.S. PATENT DOCUMENTS

| | | |
|---|---|---|
| 2018/0032651 A1 | 2/2018 | Snyder |
| 2018/0317095 A1 | 11/2018 | Rumler et al. |

FOREIGN PATENT DOCUMENTS

| | | |
|---|---|---|
| DE | 197 40 972 C1 | 3/1999 |
| DE | 197 81 804 | 5/1999 |
| DE | 100 11 661 B4 | 9/2011 |
| EP | 0 813 129 A2 | 12/1997 |
| EP | 0 875 826 A1 | 11/1998 |
| EP | 1 204 033 | 5/2002 |
| EP | 1 284 446 | 2/2003 |
| GB | 2 328 523 | 2/1999 |
| GB | 2 348 020 | 9/2000 |
| GB | 2 371 884 | 8/2002 |
| GB | 2 427 797 A | 1/2007 |
| GB | 2 431 553 A | 4/2007 |
| GB | 2 446 343 A | 8/2008 |
| JP | 1-298389 | 12/1979 |
| JP | 60-75909 A | 4/1985 |
| JP | 1-120593 | 5/1989 |
| JP | 2-310602 | 12/1990 |
| JP | 03-257509 A | 11/1991 |
| JP | 5-54277 | 3/1993 |
| JP | 6-26093 | 2/1994 |
| JP | 7-036538 | 2/1995 |
| JP | 7-248941 | 9/1995 |
| JP | 8-314760 | 11/1996 |
| JP | 9-134213 A | 5/1997 |
| JP | 9-330013 | 12/1997 |
| JP | 11-007315 A | 1/1999 |
| JP | 2000-047860 | 2/2000 |
| JP | 2000-050531 | 2/2000 |
| JP | 2000-148226 A | 5/2000 |
| JP | 2000-242323 A | 9/2000 |
| JP | 2000-243323 A | 9/2000 |
| JP | 2000-266213 A | 9/2000 |
| JP | 2000-292584 A | 10/2000 |
| JP | 2000-311004 | 11/2000 |
| JP | 2000-346299 A | 12/2000 |
| JP | 2001-273006 A | 10/2001 |
| JP | 2002-140114 | 5/2002 |
| JP | 2002-189503 A | 7/2002 |
| JP | 2002-215221 A | 7/2002 |
| JP | 2002-258936 | 9/2002 |
| JP | 2002-303564 | 10/2002 |
| JP | 2003-132476 A | 5/2003 |
| JP | 2004-199656 A | 7/2004 |
| JP | 2003-034629 A | 9/2004 |
| JP | 2005-216292 A | 8/2005 |
| JP | 2006-244072 A | 9/2006 |
| JP | 2007-150756 A | 6/2007 |
| JP | 9-288512 | 11/2007 |
| JP | 2007-536632 A | 12/2007 |
| JP | 2013-200670 A | 10/2013 |
| WO | WO-97/38362 | 10/1997 |
| WO | WO-97/45778 | 12/1997 |
| WO | WO-00/055825 A1 | 9/2000 |
| WO | WO-01/06349 A1 | 1/2001 |
| WO | WO-01/035190 A2 | 5/2001 |
| WO | WO-02/013036 A1 | 2/2002 |
| WO | WO-02/013412 A1 | 2/2002 |
| WO | WO-02/013413 A1 | 2/2002 |
| WO | WO-02/013414 A1 | 2/2002 |
| WO | WO-02/25506 A1 | 3/2002 |
| WO | WO-02/075565 A1 | 9/2002 |
| WO | WO-2004/086783 A1 | 10/2004 |
| WO | WO-2005/109122 A1 | 11/2005 |
| WO | WO-2005/109123 A1 | 11/2005 |
| WO | WO-2007/067645 | 6/2007 |
| WO | WO-2007/126610 A2 | 11/2007 |
| WO | WO-2008/004955 A2 | 1/2008 |
| WO | WO-2008/127631 A1 | 10/2008 |

OTHER PUBLICATIONS

"Multiple Interpenetrating MultiDiGraphs," Dust Incorporated, 12 pages. (Powerpoint).
"Powerful Solutions for Digital Plants", Mimic Simulation v2.6, Mynah Technologies 2003, pp. 1-15.
"SmartMesh-XT CLI Commands Guide," Dust Networks, Inc., Jun. 27, 2007, 36 pages.
SmartMesh-XT KT1030/KT2135/KT2030 Evaluation Kit Guide, Dust Networks, Inc., Nov. 2, 2007, 58 pages.
"SmartMesh-XT M2135-2, M2030-2 2.4 GHz Wireless Analog/Digital/Serial Motes," Dust Networks, Inc., Mar. 28, 2007, 33 pages.
SmartMesh-XT Manager XML API Guide, Dust Networks, Inc., Apr. 4, 2007, 148 pages.
"System Description for Security Review SmartMesh Alba," Dust Networks, 36 pages.
Alsop et al., "What Dynamic Simulation Brings to a Process Control Engineer: Applied Case Study to a Propylene/Propane Splitter," <URL:http://www.aspentech.com/publication_files/ertc2004_alsop_ferrer.pdf> (May 2004).
Annunziata et al., "NETPLAN: A Rule Based System to Design Packet Switching Data Networks," *Microprocessing and Microprogramming*, 27(1-5):749-756 (1989).
Bailey, "Introducing Bailey Evolution 90™ . . . The Sound Investment Strategy for Process Automation", 1993.
Bailey, "Wide-Range, Fully Compatible Family of Process Automation and Management Systems", 1993.
Chinese Office Action for Application No. 2003101027291, dated Jun. 21, 2007.
Chinese Office Action for Application No. 2003101027291, dated Nov. 19, 2010.
Chinese Rejection Decision for Application No. 2003101027291, dated Feb. 5, 2010.
Combined Search and Examination Report for Application No. GB 0514161.9, dated Jan. 10, 2006.
Combined Search and Examination Report for Application No. GB 0514164.3, dated Dec. 23, 2005.
Computer Products, "Unbundling the DCS", approximately 1992.
Decision of Rejection for Japanese Application No. 2012-183410 dated Apr. 22, 2014.
Drath et al., "Computer-aided design and implementation of interlock control code", Proceedings of the 2006 IEEE Conference on Computer Aided Control Systems Design, Munich, Germany, Oct. 4-6, 2006, pp. 2653-2658. (Year: 2006).
Elsag Bailey, "Elsag Bailey Automation", approximately 1993.
European Examination Report for Application No. 08163422.2, dated Apr. 1, 2011.
European Search Report for Application No. EP08163422, dated Jul. 8, 2009.
European Search Report for Application No. EP13163021.2, dated May 14, 2013.
Examination Report for Application No. GB0719214.9, dated Aug. 10, 2010.
Examination Report for Application No. GB0719214.9, dated Mar. 4, 2010.
Examination Report for Application No. GB0719214.9, dated Oct. 11, 2010.
Examination Report for Application No. GB0719214.9, dated Sep. 9, 2009.
Examination Report for European Application No. 08163422.2-2416, dated Oct. 30, 2012.
Examination Report for GB0815878.4 dated Feb. 27, 2012.
Examination Report for GB0815878.4 dated Sep. 30, 2011.
Examination Report for GB1201553.3 dated Feb. 27, 2012.
Examination Report for GB1201554.1 dated Feb. 27, 2012.
Examination Report issued in Philippine Patent Application No. 1/2017/000197 dated Jun. 30, 2020.
Final Office Action received in U.S. Appl. No. 14/425,662, dated May 26, 2016.
Final Office Action received in U.S. Appl. No. 14/425,662, dated Oct. 18, 2016.
Fisher-Rosemount, "Managing the Process Better", Dec. 1993.

(56) References Cited

OTHER PUBLICATIONS

Fisher-Rosemount, "Managing the Process Better", Sep. 1993.
German Office Action for Application No. 103 48 564.3, issued on Jul. 16, 2012.
German Office Action for Application No. 10348563.5-55.
Hoernicke et al., "System and Method for a Human Machine Interface based Automatic Generation of Process Simulation Models", An IP.com Prior ArtDatabase Technical Disclosure, IP.com No. IPCOM000212470D IP.com Electronic Publication Date: Nov. 14, 2011 (Year: 2011).
Honeywell, "Process Manager Specification and Technical Data", Sep. 1991.
Honeywell, "TDC 3000 Overview", approximately 1992.
Honeywell, "TDC 3000 Process Manager", approximately 1992.
Honeywell, "UDC 6000 Process Controller", Aug. 1992.
IEEE 100 The Authoritative Dictionary of IEEE Standards Terms, 2000, Seventh Edition, p. 1054.
Invensys Process Systems News, Invensys Introduces Enhanced Foxboro Engineering and Operations for the I/A Series Automation System, (2002): Retreived from the Internet on May 28, 2010: <URL:http://www.automation.com/smc/print.php?stripImages=no>.
Japanese Office Action for 2010-108486 dated Mar. 6, 2012.
Japanese Office Action for Application No. 2003-358631, dated Sep. 4, 2007.
Kuo et al., "Load Adjustment in Adaptive Real-Time Systems," *IEEE Real-Time Systems Symposium* (1991).
Leeds and Northrup, "Make Your Automation Plan a Reality: MAX 1000", approximately 1990.
Liu et al., "An Efficiency Quality of Service Routing Algorithm for Delay-Sensitive Applications," Comupter Networks, v(47) (2005).
Magin, "Digitale Prozessleittechnik," 1st Edition, Vogel Publishing, pp. 145-153 (1987).
Nahavandi et al., "A Virtual Manufacturing Environment with an Element of Reality," *Advanced Factory Automation*, Conf. Pub. 398: 624-629 (1994).
National Instruments, "What Is Data Acquisition", printed Aug. 11, 2014, pp. 1-2.
Non-Final Office Action received in U.S. Appl. No. 14/425,662, dated Feb. 22, 2016.
Non-Final Office Action received in U.S. Appl. No. 14/425,662, dated Jul. 13, 2015.
Notice of Reasons for Rejection for Japanese Application No. 2007-258407 dated May 22, 2012.
Notice of Reasons for Rejection for Japanese Application No. 2010-108486, dated Jan. 7, 2013.
Notice of Reasons for Rejection for Japanese Application No. 2011-27092, dated Nov. 13, 2012.
Notice of Reasons for Rejection for Japanese Application No. 2011-274307, dated Feb. 5, 2013.
Notice of Reasons for Rejection for Japanese Application No. 2012-183410, dated Jul. 23, 2013.
Notice of Reasons for Rejection for Japanese Application No. 2012-195268, dated Aug. 13, 2013.
Notice of Reexamination for Chinese Application No. 200810213725.3 dated Jul. 1, 2015.
Notice of Rejection for Japanese Application No. 2000-134873, dated Feb. 3, 2004.
Notice of Rejection for Japanese Application No. 2003-358631, dated Jan. 16, 2007.
Notice of Rejection for Japanese Application No. 2003-358631, dated Sep. 4, 2007.
Notice of Rejection for Japanese Application No. 2003-362187, dated Nov. 2, 2009.
Notice of Rejection for Japanese Application No. 2003-362187, dated Sep. 6, 2010.
Office Action for Chinese Patent Application No. 200610139719.9, dated Jan. 8, 2010.
Office Action for Chinese Patent Application No. 200810213725.3, dated Apr. 1, 2014.
Office Action for Chinese Patent Application No. 200810213725.3, dated Jan. 31, 2012.
Office Action for Chinese Patent Application No. 200810213725.3, dated Oct. 8, 2014.
Office Action for European Application No. 08163422.2 dated Nov. 5, 2015.
Office Action for European Patent Application No. 08 163 422.2, dated Dec. 1, 2016.
Office Action for European Patent Application No. 08163422.2, dated Aug. 26, 2014.
Office Action for European Patent Application No. 13 163 021.2, dated Dec. 1, 2016.
Office Action for Japanese Patent Application No. 2008-223390 dated Nov. 13, 2012.
Office Action for Japanese Patent Application No. 2013-76610, dated Apr. 1, 2014.
Office Action for U.S. Appl. No. 11/537,975, dated Jul. 8, 2009.
Office Action issued in Chinese Application No. 201310529560.1, dated Aug. 27, 2015.
Office Action issued in Philippine Patent Application No. 1/2017/00019 dated Jan. 8, 2018.
Ohmura, "Dynamic Simulator Visual Modeler," pp. 20-27 (1998).
Podesta et al., "Virtual Instrumentation for the Management, Simulation and Control of an In House Power Plant," IEEE Instrumentation and Measurement Technology Conference, pp. 1104-1106 (1996).
PSS 21S-2B8 B4, FoxView Software, pp. 1-12 (2005).
Questioning for Japanese Patent Application No. 2003-362187 dated Feb. 14, 2012.
Reliance Electric Company, "Multitasking Capability Simplifies Process Control Design", approximately late 1980s, by Angelo J. Notte.
SCADA, Wikipedia, printed Aug. 11, 2014, pp. 1.
Search Report for Applicaiton No. GB0719214.9, dated Feb. 12, 2008.
Search Report for Application No. GB 0010850.6, dated Sep. 5, 2000.
Search Report for Application No. GB 0324470.4, dated Mar. 25, 2004.
Search Report for Application No. GB 0324633.7, dated Mar. 30, 2004.
Search Report for Application No. GB0719214.9, dated Feb. 12, 2008.
Search Report for Application No. GB0815878.4, dated Nov. 26, 2008.
Search Report for Application No. GB1711105.5, dated Jan. 4, 2018.
Second Office Action for Chinese Application No. 200710164172.2, dated Jun. 5, 2012.
Second Office Action issue in Chinese Application No. 201310529560.1, dated Apr. 13, 2016.
Song et al., "A Study of Process Data Transmission Scheduling in Wireless Mesh Networks," ISA EXPO 2007 Technical Conference (Sep. 2007).
Song et al., "Challenges of Wireless Control in Process Industry," *Workshop on Research Directions for Security and Networking in Critical Real-Time and Embedded Systems* (2006).
Third Office Action issued in Chinese Application No. 201310529560.1, dated Sep. 2, 2016.
Tonnerre et al., "Mesh Networking for Low-Rate Systems," IEEE 15-06-0238-00-0005, IIEEE mentor, May 15, 2006.
Toshiba, "Toshiba Integrated Control Systems", Nov. 1990.
U.S. Appl. No. 13/444,350, filed Apr. 11, 2012.
UPID Brochure, Cutler Technology Corporation, <URL:http://www.culter-tech.com> (2010).
U.S. Appl. No. 14/725,662, filed May 29, 2015.
Wikipedia, "SCADA," (2014).
WirelessHART Specifications Retrieved from the Internet: <URL:http://www.hartcomm.org>.
Yumoto, "Evolving Dynamic Simulator: Visual Modeler," *Separation Technology*, 6(6):367-372 (1999).
U.S. Appl. No. 15/221,096, "Plant Builder System With Integrated Simulation and Control System Configuration" filed Jul. 27, 2016.

(56) References Cited

OTHER PUBLICATIONS

U.S. Appl. No. 12/201,734, "Configuring and Optimizing a Wireless Mesh Network" filed Aug. 29, 2008.
Search Report for Application No. GB2119028.5, dated Jun. 1, 2022.

SUGGESTIVE DEVICE CONNECTIVITY PLANNING

TECHNICAL FIELD

The present disclosure generally relates to designing and managing wireless networks and, more particularly, to techniques for graphically designing a wireless network in a process control environment by means of an interactive user interface.

BACKGROUND

Distributed process control systems, such as distributed or scalable process control systems like those used in power generation, chemical, petroleum, or other processes, typically include one or more process controllers communicatively coupled to each other, to at least one host or operator workstation via a process control network, and to one or more instrumentation or field devices via analog, digital, or combined analog/digital buses.

The field devices perform functions within the process or plant such as opening or closing valves, switching devices on and off, and measuring process parameters. Example field devices include valves, valve positioners, switches, and transmitters (e.g., devices including sensors for measuring temperature, pressure, or flow rate; and transmitters for transmitting the sensed temperatures, pressures, and flow rates).

The process controllers, which are typically located within the plant environment, receive signals indicative of process measurements made by the field devices (or other information pertaining to the field devices) and execute a controller application that runs, for example, different control modules which make process control decisions, generate control signals based on the received information, and coordinate with the control modules or blocks being implemented in smart field devices (e.g., HART®, WirelessHART®, and FOUNDATION® Fieldbus field devices).

Execution of the control modules causes the process controllers to send the control signals over the communication links or signal paths to the field devices, to thereby control the operation of at least a portion of the process plant or system (e.g., to control at least a portion of one or more industrial processes running or executing within the plant or system). For example, a first set of controller(s) and field devices may control a first portion of a process being controlled by the process plant or system, and a second set of controller(s) and field devices may control a second portion of the process.

Input/output (I/O) cards (sometimes called "I/O devices" or "I/O modules"), which are also typically located within the plant environment, generally are communicatively disposed between a controller and one or more field devices, enabling communications there between (e.g. by converting electrical signals into digital values and vice versa). Typically, an I/O card functions as an intermediary node between a process controller and one or more field devices inputs or outputs configured for the same communication protocol or protocols as those utilized by the I/O card.

As utilized herein, field devices, controllers, and I/O devices are generally referred to as "process control devices," and are generally located, disposed, or installed in a field environment of a process control system or plant. The network formed by one or more controllers, the field devices communicatively connected to the one or more controllers, and the intermediary nodes facilitating communication between the controllers and field devices may be referred to as an "I/O network" or "I/O subsystem."

Information from the I/O network(s) may be made available over a data highway or communication network (the "process control network") to one or more other hardware devices, such as operator workstations, personal computers or computing devices, handheld devices, data historians, report generators, centralized databases, or other centralized administrative computing devices that are typically placed in control rooms or other locations away from the harsher field environment of the plant, e.g., in a back-end environment of the process plant.

The information communicated over the process control network enables an operator or a maintenance person to perform desired functions with respect to the process via one or more hardware devices connected to the network. These hardware devices may run applications that enable an operator to, e.g., change settings of the process control routine(s), modify the operation of the control modules within the process controllers or the smart field devices, view the current state of the process or status of particular devices within the process plant, view alarms generated by field devices and process controllers, simulate the operation of the process for the purpose of training personnel or testing the process control software, diagnose problems or hardware failures within the process plant, etc. The process control network or data highway utilized by the hardware devices, controllers, and field devices may include a wired communication path, a wireless communication path, or a combination of wired and wireless communication paths.

Generally speaking, a communication network (e.g., an I/O network in a process control environment) includes nodes which are the senders and recipients of data and communication links or paths connecting the nodes. Additionally, communication networks typically include dedicated routers responsible for directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high-volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium.

In the process control industry, it is known to use standardized communication protocols to enable devices made by different manufacturers to communicate with one another in an easy to use and easy to implement manner. One such well known communication standard used in the process control industry is the Highway Addressable Remote Transmitter (HART) Communication Foundation protocol, referred to generally as the HART protocol. Generally speaking, the HART protocol supports a combined digital and analog signal on a dedicated wire or set of wires, in which on-line process signals (such as control signals, sensor measurements, etc.) are provided as an analog current signal (e.g., ranging from 4 to 20 milliamps) and other signals, such as device data, requests for device data, configuration data, alarm and event data, etc., are provided as digital signals superimposed or multiplexed onto the same wire or set of wires as the analog signal. However, the typical HART implementations rely on dedicated, hardwired communication lines, resulting in significant wiring needs within a process plant.

Over the years, there has been a move to incorporate wireless technology into various industries including the process control industry. However, significant hurdles exist in the process control environment and industry that limit the full-scale incorporation, acceptance and use of wireless technology, as the process control industry requires a completely reliable process control network because loss of signals can result in the loss of control of a plant, leading to catastrophic consequences, including explosions, the release of deadly chemicals or gases, etc. Moreover, there have been many advances in the use of wireless communication systems in general that may be applicable to the process control industry, but which have not yet been applied to the process control industry in a manner that allows or provides a reliable, and in some instances completely wireless, communication network within a process plant.

Moreover, existing tools for designing wireless communication networks in process control environments present a number of challenges. Generally speaking, designing a wireless network using these tools is a time consuming and tedious process.

Note, this background description provides context to facilitate understanding and appreciating the detailed description below. Work of the presently named inventors, to the extent described in this background section (as well as aspects of the background description that may not otherwise qualify as prior art at the time of filing) are neither expressly nor impliedly admitted as prior art against the present disclosure.

SUMMARY

A network design tool enables users to easily and quickly graphically design a model of a wireless communication network in a process control environment. Specifically, the network design tool may provide an interactive user interface including a canvas that enables users to design network models by way of the users placing and arranging within the canvas symbols representing model devices and links. The tool may dynamically indicate the strengths of communication links at potential locations as the user moves a pointer or cursor around the canvas, and may automatically suggest devices to be added to desired locations. After a desired device has been selected, the tool may automatically connect the selected device to other devices in the model based on an analysis of the plant environment, real-world positions of the existing devices and the new device, and signaling attributes of the existing devices and the new device.

In an embodiment, a method comprises any one or more of: (1) displaying a canvas configured to enable users to design network models of networks in process control environments by way of the users placing and arranging within the canvas symbols representing devices and links to be included in the networks; (2) detecting a set of device symbols on the canvas representing a set of model devices included in a network model; (3) detecting a selection of a canvas position on the canvas; calculating one or more signal strengths, at a real-world position corresponding to the canvas position, for the set of model devices; (4) calculating one or more signal strengths, at a real-world position corresponding to the canvas position, for the set of model devices; and/or (5) generating and displaying a user selectable list of suggested model devices, selected from a plurality of potential model devices, to be placed at the canvas position and added to the network model, wherein the user selectable list is generated based on: (i) the calculated one or more signal strengths at the real-world position; and (ii) wireless signaling attributes of the plurality of potential devices. The calculated one or more signal strengths may be calculated based on an analysis of: (i) the real-world position corresponding to the canvas position; (ii) real-world positions of each model device included in the set of model devices included in the network; and (iii) wireless signaling attributes of each device included in the set of model devices include in the network.

In an embodiment, a system comprises any one or more of: (1) a user interface including a display and a user input component; and/or (2) one or more processors coupled to the user interface. The one or more processors may be configured to do any one or more of: (1) display, via the display, a canvas configured to enable users to design mesh network models of mesh networks in process control environments by way of the users placing and arranging within the canvas symbols representing network devices and links to be included in the mesh networks; (2) detect a set of device symbols on the canvas representing devices included in a mesh network model; (3) detect, via the user input component, a selection of a canvas position on the canvas; (4) calculate one or more signal strengths, at a real-world position corresponding to the canvas position, for the set of devices based on an analysis of: (i) the real-world position corresponding to the canvas position; (ii) real-world positions of each device included in the set of devices included in the mesh network; and (iii) wireless signaling attributes of each device included in the set of devices include in the mesh network; and/or (5) generate and display, via the display, a user selectable list of suggested devices, selected from a plurality of potential devices, to be placed at the canvas position and added to the mesh network model, wherein the user selectable list is generated based on: (i) the calculated one or more signal strengths at the real-world position; and (ii) wireless signaling attributes of the plurality of potential devices.

In an embodiment, a method comprises any one or more of: (1) displaying a canvas configured to enable users to design network models of networks in process control environments by way of the users placing and arranging within the canvas symbols representing network devices and links to be included in the networks; (2) detecting a set of device symbols on the canvas representing devices included in a mesh network model; (3) detecting a pointer, representing a position of a user, at a first canvas position on the canvas; and/or (4) dynamically displaying one or more signal strength indications representing one or more signal strengths for the set of devices relative to the pointer. Dynamically displaying the one or more signal strength indications may include any one or more of: (i) calculating the one or more signal strengths, at a first real-world position corresponding to the first canvas position, for the set of devices; (ii) displaying the one or more signal strength indications such that they possess a first property representing the one or more signal strengths at the first real-world position; (iii) detecting the pointer moving from the first canvas position to a second canvas position; (iv) responding to detecting the user pointer element moving by recalculating the one or more signal strengths at a second-real world position corresponding to the second canvas position; and/or (v) updating the one or more signal strength indications to indicate the recalculated one or more signal strength, wherein the updated one or more signal strength indications possess a second property representing the recalculated one or more signal strengths at the second real-world position.

In an embodiment, a system comprises any one or more of: (1) a user interface including a display and a user input component; and/or (2) one or more processors coupled to the user interface. The one or more processors may be configured to do any one or more of: (1) display, via the display, a canvas configured to enable users to design network models of networks in process control environments by way of the users placing and arranging within the canvas symbols representing network devices and links to be included in the networks; (2) detect a set of device symbols on the canvas representing devices included in a mesh network model; (3) detect, via the user input component, a pointer representing a position of a user at a first canvas position on the canvas; and/or (4) dynamically display, via the display, one or more signal strength indications representing one or more signal strengths for the set of devices relative to the pointer. Causing the one or more processors to dynamically displaying the one or more signal strength indications may include causing the one or more processors to perform any one or more of the following operations: (i) calculate the one or more signal strengths, at a first real-world position corresponding to the first canvas position, for the set of devices; (ii) display the one or more signal strength indications such that they possess a first property representing the one or more signal strengths at the first real-world position; (iii) detect the pointer moving from the first canvas position to a second canvas position; (iv) respond to detecting the user pointer element moving by recalculating the one or more signal strengths at a second-real world position corresponding to the second canvas position; and/or (v) update the one or more signal strength indications to indicate the recalculated one or more signal strength, wherein the updated one or more signal strength indications possess a second property representing the recalculated one or more signal strengths at the second real-world position.

DETAILED DESCRIPTION

Figure 1:
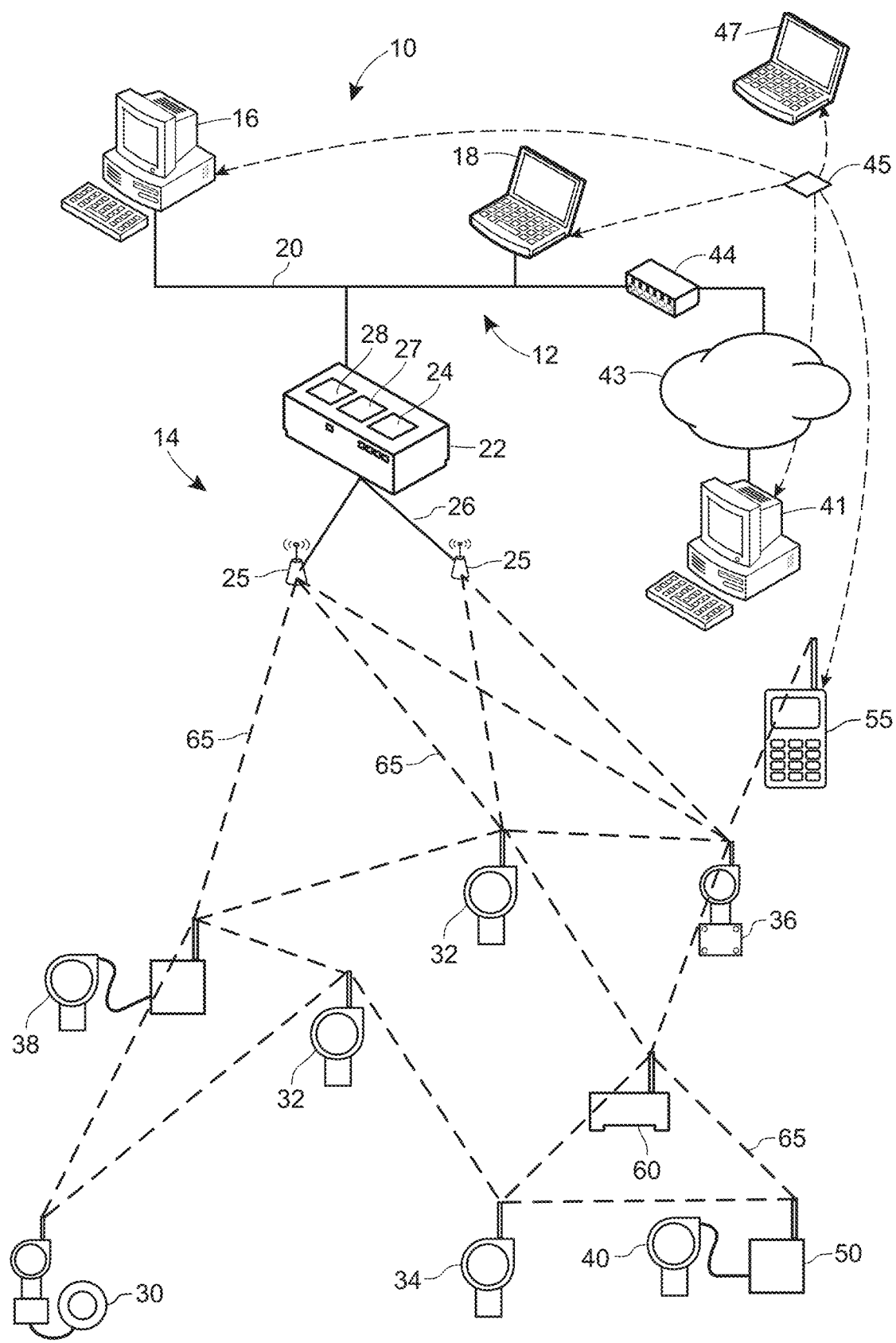
FIG. 1 is a block diagram of an exemplary network including a wireless I/O network that may be designed and configured via a network design tool, in accordance with the techniques described herein.

The described methods and systems enable users to easily and quickly graphically design a wireless network model of a communication network in a process control environment. Specifically, a network design tool may provide an interactive user interface including a canvas that enables users to design network models of networks in process control environments by way of the users placing and arranging within the canvas symbols representing models of devices and links to be included in the networks. The network model designed via the tool may be utilized to configure the network it represents.

The canvas may display a scaled image or layout of the plant, including walls, equipment, etc. While the user interface may include a library of icons or symbols representing model network devices and links that a user can drag onto the canvas to design the network model, the user interface may also respond to a user clicking (or otherwise interacting with) a position on the canvas (representing a real-world position) by automatically suggesting one or more model devices to be placed at the position. The tool may analyze a map or layout of the plant environment (e.g., walls, equipment, etc.), the location of existing devices in the model, the signaling attributes or strengths of those devices, network preferences or constraints, or the signaling attributes of potential devices to identify (from the potential device) a set of suggested model devices for the desired location or position. One or more of the network preferences or constraints may be adjustable by a user.

Example model network devices that may be added to the network model include: wireless access points, gateways, routers, switches, wireless computers/mobile devices, wireless field devices, wireless adapters for wired field devices, etc.

Example network preferences or constraints include network topology (e.g., mesh network, star network, etc.). A mesh network is a network topology in which the nodes connect directly, dynamically, and non-hierarchically to as many other nodes as possible and cooperate with one another to efficiently route data from/to clients. This lack of dependency on one node allows for many nodes to participate in the relay of information. Typically, mesh networks dynamically self-organize and self-configure, which can reduce installation overhead. The ability to self-configure enables dynamic distribution of workloads, particularly in the event a few nodes should fail. This in turn contributes to fault-tolerance and reduced maintenance costs. A star network is a spoke-hub distribution topology. In a star network, every host is connected to a central hub. In its simplest form, one central hub acts as a conduit to transmit messages. In some instances, a series of star networks may be connected to each other to form a single network.

In any event, after model devices have been suggested to the user, the user can then select from the list of suggested model devices, causing the canvas and network model to be updated accordingly. If desired, before the user selects a desired position or device, the tool may automatically and dynamically display, based on a user's position on the canvas (e.g., based on the user's cursor or point position), indications or visualizations of the strength of potential communication links that may established to connect a new model device to the shown network. After a user selects a new model device to be added to the network model, the tool may automatically analyze the model devices already included in the model network and the new model device (e.g., signaling attributes, real-world positions, etc.), a plant layout (e.g., include obstacles such as equipment and walls), or network preferences or constraints, and may automatically connect the new model device to one or more of the existing model devices based on the analysis.

The model network and devices may include relevant configuration information that may eventually be downloaded to the network devices represented by the network model or network manager(s) responsible for configuring and managing the network devices. The configuration information may include routing and scheduling information, neighbor information, etc. This configuration information may be generated based on default values or information that is provided while the user is using the network design tool.

After a model network has been created or edited, a network may be configured accordingly. For example, physical devices may be installed in the plant at locations corresponding to the locations of the model devices in the network model, and one or more of the network devices (e.g., gateways, access points, routers, etc.) or network manager devices may be updated with the configuration information stored to the network model so that the network performs as designed. The relevant configuration data may be downloaded directly to the network devices, or may be downloaded via a network manager that "manages" various aspects of the network (e.g., the allocation of time slots for communication).

I. An Example Network

FIG. 1 illustrates an exemplary network 10 including a wireless I/O network 14 that may be designed and configured via a network design tool 45, in accordance with the techniques described herein. The wireless I/O network 14 may operate according to protocols for I/O networks in process plants, such as wireless HART.

In addition to the wireless I/O network 14, the network 10 may include a plant automation network 12, which may include one or more stationary workstations 16 and one or more portable workstations 18 connected over a communication backbone 20. The backbone 20 may be implemented over Ethernet, RS-485, Profibus DP or other suitable communication protocol. The plant automation network 12 and the wireless I/O network 14 may be connected via a gateway 22. Specifically, the gateway 22 may be connected to the backbone 20 in a wired manner and may communicate with the plant automation network 12 by using any suitable known protocol. The gateway 22 may be implemented as a standalone device, as a card insertable into an expansion slot of the hosts or workstations 16 or 18, or as part of the IO subsystem of a PLC-based or DCS-based system, or in any other manner. The gateway 22 provides applications running on the network 12 access to various devices of the wireless I/O network 14. In addition to protocol and command conversion, the gateway 22 may provide synchronized clocking used by time slots and superframes (sets of communication time slots spaced equally in time) of the scheduling scheme of the wireless I/O network 14.

Generally speaking, a "superframe" may be understood as a collection of time slots repeating in time. The number of slots in a given superframe (superframe size) determines how often each slot repeats, thus setting a communication schedule for network devices that use the slots. Each superframe may be associated with a certain graph identifier. In some embodiments, the network 14 may contain several concurrent superframes of different sizes. Moreover, a superframe may include multiple radio channels, or radio frequencies.

In any event, in some situations, the networks 10/12/14 may have more than one gateway 22. These multiple gateways can be used to improve the effective throughput and reliability of the network by providing additional bandwidth for the communication between the wireless I/O network 14 and the plant automation network 12 or the outside world. On the other hand, the gateway 22 device may request bandwidth from the appropriate network service according to the gateway communication needs within the wireless HART network. The gateway 22 may further reassess the necessary bandwidth while the system is operational. For example, the gateway 22 may receive a request from a host residing outside the wireless I/O network 14 to retrieve a large amount of data. The gateway device 22 may then request additional bandwidth from a dedicated service such as a network manager in order to accommodate this transaction. The gateway 22 may then request the release of the unnecessary bandwidth upon completion of the transaction.

In some embodiments, the gateway 22 is functionally divided into a virtual gateway 24 and one or more network access points 25. Generally speaking, an "access point" is a device that converts wired traffic (e.g., packets) to wireless traffic and vice versa. It may be thought of as a node between a wired network or sub-network and wireless network or sub-network.

Network access points 25 may be separate physical devices in wired communication with the gateway 22 in order to increase the bandwidth and the overall reliability of the wireless I/O network 14. However, while FIG. 1 illustrates a wired connection 26 between the physically separate gateway 22 and access points 25, it will be understood that the elements 22-26 may also be provided as an integral device. Because network access points 25 may be physically separate from the gateway device 22, the access points 25 may be strategically placed in several distinct locations. In addition to increasing the bandwidth, multiple access points 25 can increase the overall reliability of the network by compensating for a potentially poor signal quality at one access point at one or more other access points. Having multiple access points 25 also provides redundancy in case of failure at one or more of the access points 25. Note, during the design phase for the network 14, the tool 45 may suggest model access points representing the access points 25 be added to a network model (e.g., when the user has selected a desired location at or near the end of the range of other devices in the network). For example, when a user places a model device at a location out of range of other devices in the model network, the tool 45 may automatically place one or more model access points in between the new device and the other devices in the model order to extend range and facilitate connection of the new device to the network.

The gateway device 22 may additionally contain a network manager software module 27 and a security manager software module 28. In another embodiment, the network manager 27 and/or the security manager 28 may run on one of the hosts on the plant automation network 12. For example, the network manager 27 may run on the host 16 and the security manager 28 may run on the host 18. The network manager 27 may be responsible for configuration of the network, scheduling communication between wireless HART devices (e.g., configuring superframes), management of the routing tables and monitoring and reporting the health of the wireless I/O network 14. While redundant network managers 27 are supported, it is contemplated that there should be only one active network manager 27 per wireless I/O network 14.

Referring again to FIG. 1, the wireless I/O network 14 may include one or more field devices 30-40. In general, process control systems, like those used in chemical, petroleum or other process plants, include such field devices as valves, valve positioners, switches, sensors (e.g., temperature, pressure and flow rate sensors), pumps, fans, etc. Field devices perform control functions within the process such as opening or closing valves and taking measurements of process parameters. In the wireless I/O network 14, the field devices 30-40 may be producers and consumers of wireless HART packets. The tool 45 may suggest model wireless field devices when a user is designing a network such as the network 14, and the user may add symbols of the model field devices to a canvas provided by the tool 45 to add the model field devices to a model network.

An external host 41 may be connected to a network 43 which, in turn, may be connected to the plant automation network 12 via a router 44. Generally speaking, a "router" is a device that forwards data packets along networks and is connected to at least two networks, commonly two LANs, WANs, or a LAN and its ISP's network. Routers may be located at a "gateway" where two or more networks connect. Typically, routers use headers and forwarding tables to determine paths for forwarding packets and use protocols to communicate with each other to configure a route between hosts. This is in contrast to a network switch, which typically forwards traffic to a next node without necessarily knowing the final destination of the traffic or the path of the traffic to the final destination.

In any event, the network 43 may be, for example, the World Wide Web (WWW). Although the external host 41 does not belong to either the plant automation network 12 or the wireless I/O network 14, the external host 41 may access devices on both networks via the router 44. If desired, the network design tool 45 may reside and run on the external host 41 and provide the wireless network configuration and simulation functionality discussed in greater detail below. Alternatively, the network design tool 45 may run on the stationary workstation 16, on the portable workstation 18 (which may be a laptop or tablet configured for touch input), or on a portable device connected directly to the wireless I/O network 14. In some embodiments, the network design tool 45 may run in a distributed manner on several hosts of the network 10. In yet another embodiment, the network design tool 45 may run on a standalone host 47 and therefore have no access or only periodic access to either the network 12 or the network 14. In this case, the feedback information related to the performance of the wireless network 14 may be entered manually into the network design tool 45 by means of the host 47.

The network design tool 45 may be implemented as a software package using one or more programming languages such as C/C++, C#, WPF, or JAVA. The software of the network design tool 45 may be stored on one or several hosts 16, 18, 41, or 47 in a conventional manner. Alternatively, the network design tool 45 may be provided on a portable memory disk such as a CD or DVD and may be loaded into the volatile memory of a computer host during operation. For example, some or all of the hosts 16, 18, 41, and 47 may include hard drives and flash drives capable of permanently storing software and CD and DVD drives compatible with a CD or DVD containing the network design tool 45. In another embodiment, the network design tool 45 may be provided as a distributed web service, or a software running remotely and accessible via the internet or intranet. For example, the remote host 41 may contain some of the software components of the network design tool 45 while the workstation 16 may provide user interface to operators via a keyboard, a mouse, a computer screen, and similar input/output devices. In accordance with this embodiment, operators may access and benefit from some or all of the features of the network design tool 45 but the software of the network design tool 45 may reside remotely for security or copyright reasons.

The wireless I/O network 14 may use a protocol, such as wireless HART, which provides similar operational performance that is experienced with wired HART devices. The applications of this protocol may include process data monitoring, critical data monitoring (with the more stringent performance requirements), calibration, device status and diagnostic monitoring, field device troubleshooting, commissioning, and supervisory process control. These applications require that the wireless I/O network 14 use a protocol which can provide fast updates when necessary, move large amounts of data when required, and support network devices which join the wireless I/O network 14 only temporarily for commissioning and maintenance work.

Referring again to FIG. 1, field devices 30-36 may be wireless HART devices. In other words, a field device 30, 32, 34, or 36 may be provided as an integral unit supporting all layers of the wireless HART protocol stack. In the network 10, the field device 30 may be a wireless HART flow meter, the field devices 32 may be wireless HART pressure sensors, the field device 34 may be a wireless HART valve positioner, and the field device 36 may a wireless HART pressure sensor. Importantly, wireless HART devices 30-36 are HART devices supporting all that users have come to expect from the wired HART protocol. In some embodiments, all wireless HART equipment includes core mandatory capabilities in order to allow equivalent device types to be exchanged without compromising system operation. Furthermore, the wireless HART protocol is backward compatible to HART core technology such as the device description language (DDL). In an embodiment, all HART devices should support the DDL, which ensures that end users immediately have the tools to begin utilizing the wireless HART protocol.

On the other hand, a field device 38 may be a legacy 4-20 mA device and a field device 40 may be a wired HART device. Field devices 38 and 40 may be connected to the wireless HART network 13 via a wireless HART adaptor (WHA) 50. Additionally, the WHA 50 may support other communication protocols such as Foundation Fieldbus, PROFIBUS, DevicesNet, etc. In these embodiments, the WHA 50 supports protocol translation on a lower layer of the protocol stack. Additionally, it is contemplated that a single WHA 50 may also function as a multiplexer and support multiple HART or non-HART devices.

Plant personnel may additionally use handheld devices for installation, control, monitoring, and maintenance of network devices. Generally speaking, handheld devices are portable equipment that can connect directly to the wireless I/O network 14 or through the gateway 22 as a host on the plant automation network 12. As illustrated in FIG. 1, a wireless HART-connected handheld device 55 communicates directly to the wireless I/O network 14. When operating with a formed wireless I/O network 14, this device may join the network 14 as just another wireless HART field device. When operating with a target network device that is not connected to a wireless HART network, the handheld device 55 may operate as a combination of the gateway device 22 and the network manager 27 by forming its own wireless HART network with the target network device.

A plant automation network-connected handheld device (not shown) connects to the plant automation network 12 through known networking technology, such as Wi-Fi. This device talks to the network devices 30-40 through the gateway device 22 in the same fashion as external plant automation servers (not shown) or the workstations 16 and 18.

Additionally, the wireless I/O network 14 may include a router device 60, which may be added to a model of the network 14 via the tool 45. The router device 60 is a network device that forwards packets from one network device to another. A network device that is acting as a router device uses internal routing tables to decide to which network device it should forward a particular packet. Stand-alone routers such as the router 60 may not be required in those embodiments where all devices on the wireless I/O network 14 support routing. However, it may be beneficial (e.g. to extend the network, or to save the power of a field device in the network) to add a dedicated router 60 to the network. During the design phase, the tool 45 may suggest adding a model router representing the router 60 to a model network, or may automatically add such a model router (e.g., as an intermediary node when a user places a device that is otherwise out of range of other devices in the network).

All devices directly connected to the wireless I/O network 14 may be referred to as network devices. In particular, the wireless HART field devices 30-36, the adaptors 50, the routers 60, the gateway 22, the access points 25, and the wireless HART-connected handheld device 55 are, for the purposes of routing and scheduling, the network devices or the nodes of the wireless I/O network 14. Models of each of these network devices may be added to a model of the network 14 via the tool 45.

In order to provide a very robust and an easily expandable network, it is contemplated that all network devices may support routing and each network device may be globally identified by its HART address. The network manager 27 may contain a complete list of network devices (e.g., in the form of model devices in a network model), and may assign each device a short, network unique 16-bit nickname. Additionally, each network device may store information related to update rates, connections sessions, and device resources. In short, each network device maintains up-to-date information related to routing and scheduling. This routing/scheduling information may be downloaded to the devices from a model of the network and devices that is created via the tool 45. That is, this information may be stored to model networks and devices created during the design phase, and may then be downloaded to the relevant devices in order to implement the designed network. The network manager 27 may transmit relevant routing and scheduling information to network devices whenever new devices join the network or whenever the network manager detects or originates a change in topology or scheduling of the wireless I/O network 14.

Further, each network device may store and maintain "neighbor information," including a list of neighbor devices that the network device has identified during the listening operations. Generally speaking, a neighbor of a network device is another network device of any type potentially capable of establishing a connection with the network device in accordance with the standards imposed by a corresponding network. In case of the wireless I/O network 14, the connection is a wireless connection. However, it will be appreciated that a neighboring device may also be a network device connected to the particular device in a wired manner. As will be discussed later, network devices promote their discovery by other network devices through advertisement, or special messages sent out during the designated timeslots. Network devices operatively connected to the wireless I/O network 14 have one or more neighbors which they may choose according to the strength of the advertising signal or to some other principle. Referring again to FIG. 1, in a pair of network devices connected by a direct wireless connection 65, each device recognizes the other as a neighbor. Thus, network devices of the wireless I/O network 14 may form a large number of connections 65. The possibility and desirability of establishing a direct wireless connection 65 between two network devices is determined by several factors such as the physical distance between the nodes, obstacles between the nodes, signal strength at each of the two nodes, etc. The tool 45 may generate a model of the network 14 that accounts for any one or more of these factors (e.g., distance between nodes, obstacles such as walls or equipment, signal strength of nodes) when suggesting devices to add to a model, when visualizing links or potential links between existing nodes and a potential new node, and/or when automatically establishing links in the model (and/or intermediate nodes) when a user adds a new device model to the network model.

Further, two or more direct wireless connections 65 may form paths between nodes that cannot form a direct wireless connection 65. For example, the direct wireless connection 65 between the wireless HART hand-held device 55 and wireless HART device 36 along with the second direct wireless connection 65 between the wireless HART device 36 the router 60 form a communication path between devices 55 and 60 (the node 36 may be thought of as an intermediary node between the nodes 55 and 60).

Each wireless connection or link 65 is characterized by a large set of parameters related to the frequency of transmission, the method of access to the radio resource, etc. One of ordinary skill in the art will recognize that, in general, wireless communication protocols may operate on designated frequencies, such as the ones assigned by the Federal Communications Commission (FCC) in the United States, or in the unlicensed part of the radio spectrum (2.4 GHz). While the system and method discussed herein may be applied to a wireless network operating on any designated frequency or range of frequencies, the embodiment discussed below relates to the wireless I/O network 14 operating in the unlicensed, or shared part of the radio spectrum. In accordance with this embodiment, the wireless I/O network 14 may be easily activated and adjusted to operate in a particular unlicensed frequency range as needed.

As noted, in one embodiment, the protocol supporting the wireless I/O network 14 is a wireless HART protocol. More specifically, each of the direct wireless connections 65 may transfer data according to the physical and logical requirements of the wireless HART protocol. The wireless HART protocol may be a secure, wireless mesh networking technology operating in the 2.4 GHz ISM radio band. In one embodiment, the wireless HART protocol may utilize IEEE 802.15.4b compatible direct sequence spread spectrum (DSSS) radios with channel hopping on a transaction-by-transaction basis. This wireless HART communication may be arbitrated using time division multiple access or Time Division Multiple Access (TDMA) to schedule link activity. All communications are preferably performed within a designated time slot. One or more source and one or more destination devices may be scheduled to communicate in a given slot, and each slot may be dedicated to communication from a single source device or to a CSMA/CA-like shared communication access mode between multiple source devices. Source devices may send messages to specific target device or broadcast messages to all of the destination devices assigned to the slot.

To enhance reliability, the wireless HART protocol may combine TDMA with a method of associating multiple radio frequencies with a single communication resource, or channel hopping. Channel hopping provides frequency diversity which minimizes interference and reduces multi-path fading effects. Further, the wireless HART protocol may offer an additional feature of channel blacklisting, or restricting the use of certain channels in the radio band by the network devices. The network manager 27 may blacklist a radio channel in response to detecting excessive interference or other problems on the channel. Further, operators or network administrators may blacklist channels in order to protect a wireless service that uses a fixed portion of the radio band that would otherwise be shared with the wireless I/O network 14.

In one embodiment, the network manager 27 is responsible for allocating, assigning, and adjusting time slot resources for the network 14, based at least in part on a network model that has been generated via the tool 45.

The protocol(s) used by the I/O network 14 may provide session-based communications between network devices. End-to-end communications may be managed on the network layer by sessions. A network device may have more than one session defined for a given peer network device. It is contemplated that in some embodiments, almost all network devices may have at least two sessions established with the network manager 27: one for pairwise communication and one for network broadcast communication from the network manager 27. Further, all network devices may have a gateway session key. The sessions may be distinguished by the network device addresses assigned to them. Each network device may keep track of security information (encryption keys, nonce counters) and transport information (reliable transport sequence numbers, retry counters, etc.) for each session in which the device participates.

Returning to the network design tool 45, it should be noted that, during the design phase, it is important to consider the location of the network devices relevant to obstacles such as equipment and walls so that the wireless network 14 can establish itself in an efficient and reliable form. In some cases, it may be necessary to add routers 60 in locations where plant equipment could block or seriously affect a wireless connection. The network tool 45 may analyze a map or layout of the plant environment to identify problematic locations and to suggest appropriate devices to mitigate any interference or blocking that might otherwise occur when a user indicates he or she wishes to place a network device at a given location, and/or to automatically add intermediary devices when necessary (e.g., when an obstacle blocks one or more signal from existing devices from reaching the location).

In any event, even when most physical obstacles are accounted for during the design phase, it may be desirable that the wireless network 14 be self-healing. To that end, the wireless network 14 may have redundant paths and schedules so that, in response to detecting a failure of one or more direct wireless connections 65, the devices in the network 14 may route data via an alternate route. The tool 45 may automatically define or establish such redundant paths and schedules while the user is designing the network, making the work of ensuring redundancy easier on the designer. In some instances, the tool 45 may be configured to automatically add model devices and communication links in a manner that prevents any pinch points (e.g., wherein a single link connects one part of the network to another part of the network, and therefore represents a single point of failure).

II. An Example Network Design Tool

Figure 2:
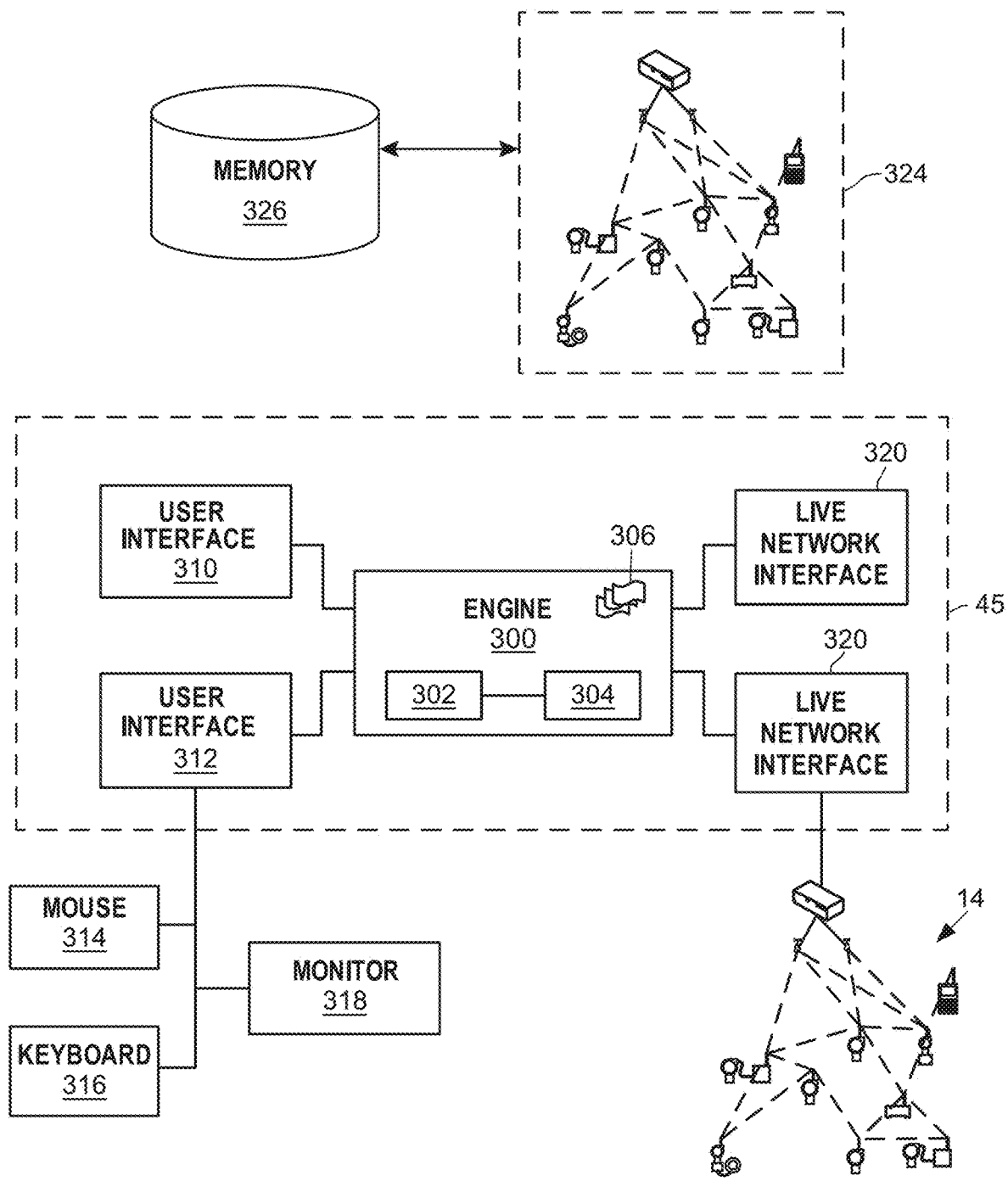
FIG. 2 is a block diagram of an exemplary architecture of the network design tool shown in FIG. 1, which may be used to graphically design, generate, or edit a network model that can be used to configure a network.

FIG. 2 depicts an exemplary architecture of the network design tool 45 that may be used to graphically design, generate, or edit a network model 324 (which may be similar to any one or more of the networks 10, 12, or 14 shown in FIG. 1). The tool 45 may be a routine or set of instructions (e.g., stored at a memory of one of the devices 16, 18, 47, 41, or 55) that is executable by one or more processors (e.g., of one or more of the devices 16, 18, 47, 41, or 55) to cause a device (e.g., one of the devices 16, 18, 47, 41, or 55) to implement the functionality described herein.

The tool 45 may include an engine 300 containing the tool logic for displaying a user interface to enable users to design network models of networks in process control environments by way of the users placing and arranging within the canvas symbols representing devices and links to be included in the networks. The engine 300 may implement logic to provide the techniques described herein relating to automatic device suggestion, the link visualization, and automatic network connection functionality (e.g., wherein when a user adds a new device model to a canvas provided by the tool 45, the tool 45 automatically establishes links to existing nodes and/or adds any intermediary nodes that might be necessary or preferable).

The tool 45 may include a graph generator 302 and a schedule generator (or "scheduler") 304 which may, in turn, interact with each other to generate or make combined routing and scheduling decisions. The engine 300 may also include a set of optimization rules 306. Each of the optimization rules 306 may contain an algorithmic description of a certain aspect of the optimization strategy and may also depend on one or more user parameters. For example, one of the optimization rules 306 may state that creating more than X number of connections to a certain node is prohibited. The user may assign a specific value to X via the user interface 312 so that the engine 300 can apply the rule during operation. In short, the engine 300 may encapsulate the intelligent components of the network design tool 45. The engine 300 may interact with one or more instances of a user interface 310-312. In some embodiments, the network design tool 45 may run in a distributed manner and may provide simultaneous access to the functionality of the engine 300 to multiple operators. For example, the workstation 16 may execute or provide the user interface 310 while the remote host 41 may execute the engine 302 and the user interface 312. Each of the user interface instances 310 and 312 may be tailored according to the hardware availability at each corresponding host and may further be tailored to the specific requirements and preferences of the operator such as language, for example. As illustrated, the user interface 312 may interact with such physical devices as a mouse 314, a keyboard 316, a monitor 318, and possibly a printer (not shown). One skilled in the art will further appreciate that the user interface 312 or the user interface 310 could be similarly connected to other input and output devices.

As indicated above, the network design tool 45 may provide a user interface via one or several interactive windows. As one familiar with the Microsoft Windows™ or similar graphic environment will recognize, an interactive window typically includes a canvas area containing text and graphics, a toolbar providing access to various functions of the corresponding software, buttons disposed on the toolbar providing shortcuts to the frequently used functions or graphical objects, and vertical and horizontal scrollbars which allow user to align the visible window with specific parts of the canvas. Generally speaking, the network design tool 45 may be implemented on any operating system. However, the operating system on which the user interface component of the network design tool 45 is executed preferably supports a graphical interface. In the embodiments discussed below, the network design tool 45 allows users to manipulate visual objects in form of geometric shapes such as circles, squares, and arrows, although other graphic objects may be used. Further, the network design tool 45 may render the graphic objects on the monitor 318 in different colors to indicate the state of the object or convey other additional information.

The engine 300 may also interact with one or more instances of a live network interface 320. The live network interface 320 may report data from the network 14 to the engine 300. In particular, the live network interface 320 may report the measurements related to the signal strength, time delay, and other network performance data measured by the network devices of the network 14. In response to receiving network performance data from the network 14 via the live network interface 320, the engine 300 may communicate these reports to one or more users via the user interfaces 310 or 312. Additionally, the engine 300 may automatically adjust routing and scheduling of a network model 324 corresponding to the wireless network 14. As illustrated in FIG. 2, the network model 324 may be stored in a memory 326 coupled to one of the hosts 16, 18, 41, 47, or 55.

III. An Example Canvas Provided by the Network Design Tool

Figure 3:
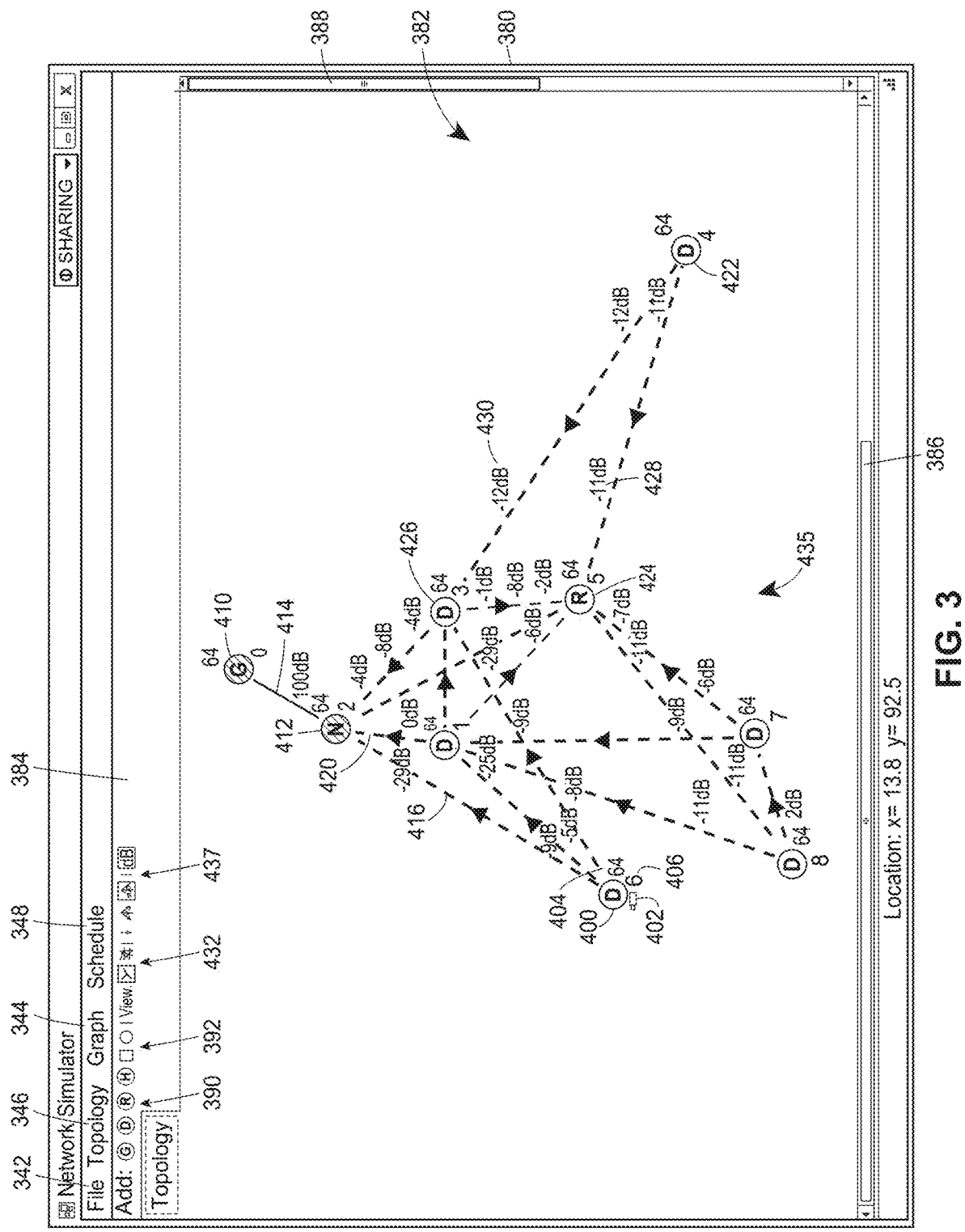
FIG. 3 depicts an interactive window including a canvas that may be presented by the network design tool shown in FIGS. 1 and 2, which enables users to design network models of networks in process control environments by way of the users placing and arranging within the canvas symbols representing devices and links to be included in the networks.

FIG. 3 depicts an interactive window 380 including a canvas 382 that may be presented by the network design tool 45 to enable users to design network models of networks in process control environments by way of the users placing and arranging within the canvas 382 symbols representing devices and links to be included in the networks. Advantageously, a user can add devices to the canvas 382 by simply clicking on a spot on the canvas where the user wants a new device. The tool 45 then suggests one or more devices to be added to the spot, based, e.g., on an analysis of the plant environment and the devices already added to the network model. Below, traditional drag-and-drop techniques are discussed before suggestive placement techniques are discussed with reference to FIGS. 4-10.

While not shown in FIG. 3, in a typical embodiment, the canvas 382 may depict in the background of the canvas 382 a representation of the physical features of the plant environment in which the designer intends to implement the designed network. The depicted plant environment may be photo-realistic, or may be simplified graphical renderings that symbolically represent relevant features (e.g., walls, process control equipment, communication dead zones, etc.). The depicted plant environment may be rendered based on map or layout data stored to a memory, such as the memory 326. The canvas 382 may be scaled to the depicted plant environment, such that the distances between network device symbols on the canvas 382 accurately represent spatial relationships between devices that would ultimately be implemented in the network based on the model. In fact, even in embodiments in which the canvas 382 is blank, the canvas 382 may be scaled to maintain this scaled spatial relationship. This scaling of the canvas 382 to a real-world environment enables a designer to easily evaluate signaling capabilities in light of real-world obstacles and constraints, such as distance, walls, and equipment.

The window 380 may include a toolbar 384 that provides interactive access to the submenus 342-348 in form of pull-down lists, enabling access to different functions provided by, or otherwise associated with, the tool 45. For example, the window 380 may include a button or element within the topology submenu 346 that causes the tool 345 to display a view of the network model 324 (also shown in FIG. 2). The interactive window 380 may include a canvas area 382, a toolbar 384, and scrollbars 386-388. Additionally, the toolbar 384 may include one or more shortcut buttons 390. The shortcut buttons 390 may provide user with an easy and efficient method of adding symbols representing various model network devices to the canvas area 382. In particular, the user may operate one of the shortcut buttons 390 to select a symbol representing a gateway device, a network access point, a field device, a router, etc. Additionally, the toolbar 384 may include non-network element buttons 392 corresponding to physical obstructions such as walls. The user may then drag the selected symbol onto the canvas area 382 using the mouse 314 or a similar pointing device. In other embodiments, the user may operate keyboard keys to enter text commands in order to select symbols and position these symbols in the canvas area 382.

The canvas area 382 may be a symbolic representation of a plant area in which the network 14 operates, which may be rendered based on a map or layout of the plant stored to memory. The placement of symbols representing model network devices may accurately reflect the relative distances between the actual devices when installed in the plant. In other words, the graphical representation of the model 324 on the canvas area 382 may be to-scale. It is also contemplated that the canvas area 382 may include a grid (not shown) in order to simplify the task of accurately placing the symbols relative to each other. In yet another embodiment, the canvas area 382 may include a schematic representation of the plant. For example, the canvas area 382 may include two- or three-dimensional, to-scale representation of tanks, valves, pipes, and other components of a process control system so that the user may easily see the correspondence between the model 324 and the actual geographic positioning of the corresponding physical devices. Still further, the canvas area 382 may schematically represent the actual physical obstructions such as walls as well as inaccessible or "forbidden" areas such as hallways or offices.

After placing a symbol representing a model network device or an obstacle on the canvas area 382, the user may further configure the modeled device by selecting the symbol, invoking an interactive parameterization window, and entering a set of parameters specific to the modeled device. In the example illustrated in FIG. 3, the user has placed several network devices symbols on the canvas area 382, including the device symbol 400. More specifically, the user may have selected the symbol representing a field device from among the shortcut buttons 390, activated the symbol by a mouse click or similar method, and dragged a copy of the symbol to the desired location in the canvas area 382. In this exemplary embodiment, the field device symbol is a circle enclosing a letter "D," the letter serving as a visual aid in differentiating between various network device types. The user may have then invoked a parameterization menu by clicking on a predefined mouse button, for example, and specified that the physical field device corresponding to the device symbol 400 is powered by means of a battery. As a result, the wireless network device tool 45 may display a battery symbol 402 next to the device symbol 400.

The user may further specify, for each field device, the rate at which the device reports measurements or other data to another network device. This report rate is also known as burst rate. In the example of the network 14, field devices report data upstream to the gateway device 22. The wireless network device tool 45 may display the burst rate as an indicator 404 placed next to the device symbol 400. The user may further specify the power at which the physical device corresponding to the device symbol 400 transmits radio signals. In one embodiment, the user may invoke a power setting option by pressing on a predefined keyboard or mouse key. In response to detecting the key press event, the network design tool 45 may display an interactive window in which the user may enter the signal strength measured in watts, for example. Alternatively, the user may configure the network design tool 45 to associate each network device with a same predetermined power level in order to simplify the process of configuring the network model 324.

As device symbols are added to the canvas area 382, the network design tool 45 may assign a sequence number to each new symbol. In another embodiment, the network design tool 45 may assign numbers according to the order in which the symbols are encountered in breadth-first traversing of a corresponding graph, with one of the gateway symbols assigned the sequence number 0 and placed at the head of the graph. In the example illustrated in FIG. 3, the network design tool 45 may display the sequence number as an indicator 406 next to the device symbol 400.

Referring again to FIG. 3, the user may have placed a gateway symbol 410 and a network access point symbol 412 on the canvas area 382. As discussed above with reference to FIG. 1, a gateway device 22 may be connected to multiple network access points 25 in a highly reliable and efficient manner, such as over a pair of dedicated wires. The network design tool 45 may indicate the relative reliability of the gateway-to-network access point connection by means of a solid line representing a wire link 414. In contrast, the network design tool 45 may illustrate wireless links by means of a dotted line as, for example, in the case of a wireless link 416 between the device symbols 400 and 412. Of course, the wireless and wired connections between network devices may also be depicted in any other manner and the lines 414 and 416 are provided by way of example only.

Next, the network design tool 45 may begin analyzing the network model 324 by evaluating the quality of every wireless link between every pair of network devices in view of such factors as the signal strength at each device, the distance between the devices, the power of each device, the type of receiving device, and the presence of obstacles which may attenuate the radio signal. Because each device may transmit radio signals at a unique power level, the parameters of a uni-directional link from device A to device B may be different from the parameters of a uni-directional link from device B to device A. For example, the network design tool 45 may estimate the quality of a uni-direction wireless link 404 by calculating the attenuation of a radio signal transmitted by the physical device corresponding to the device symbol 400 over the distance between the physical network devices represented by symbols 400 and 412. As indicated above, the distance between the devices represented by symbols 400 and 412 may be accurately reflected by the relative placement of the symbols 400 or 412 if the model 324 is drawn to scale. Alternatively, the user may specify the distance between a pair of network devices by selecting a wireless link on the network model 324, activating an appropriate setting screen, and entering the distance in feet or meters, for example. Upon completing the calculation, the network tool 45 may display a signal quality indicator 420 next to the wireless link 416. Referring again to FIG. 3, a symbol 422 representing a field device and a symbol 424 representing a router device may be connected by a wireless link may be separated by a distance X while the symbol 422 and a symbol 426 may be separated by a distance Y. The network design tool may accordingly display indicators 428 and 430 next to uni-directional links extending from device 422 to devices 424 and 426, accordingly.

The network design tool 45 may assess each wireless link as the user adds new network devices to the canvas 382. Thus, if the network model 324 includes network device symbols S1, S2, . . . Sn, the addition of a device symbol Sn+1 requires that the network design tool 45 evaluate n new links between each pair of symbols {S1, Sn+1}, {S2, Sn+1}, . . . {Sn, Sn+1}. In order to avoid clutter, the toolbar 384 may include buttons 432 which toggle optimized presentation modes. More specifically, one of the toggle buttons 432 may cause the network design tool 45 to display only those wireless links that pass a predefined quality criteria, such as, for example, the signal quality exceeding −10 dB. Conversely, another toggle button 432 may cause the network design tool 45 to display all wireless links, irrespective of the quality.

A collection of wireless links which pass a predefined set of quality criteria, along with the wired links connecting gateway devices to network access points, forms a master graph 435, which may be saved to memory as part of the model 324. Additionally, each path between a pair of network devices, such as the path from the field device symbol 422 to the gateway device symbol 412, forms an individual graph. Moreover, each graph may be an upstream or downstream graph with respect to one of the gateways. The network design tool 45 may illustrate the direction of each wireless link by means of an arrow, such as the arrow on the link 416 pointing in the direction of the network access symbol 412 to indicate that the link 416 is part of an upstream graph. The toolbar 384 may also contain a graph mode selector 437 which the user may operate in order to select between such viewing options as the display of downstream graphs only, the display upstream graphs only, or the simultaneous display of both upstream and downstream graphs

IV. An Example Method for Providing a User Interface

Figure 4:
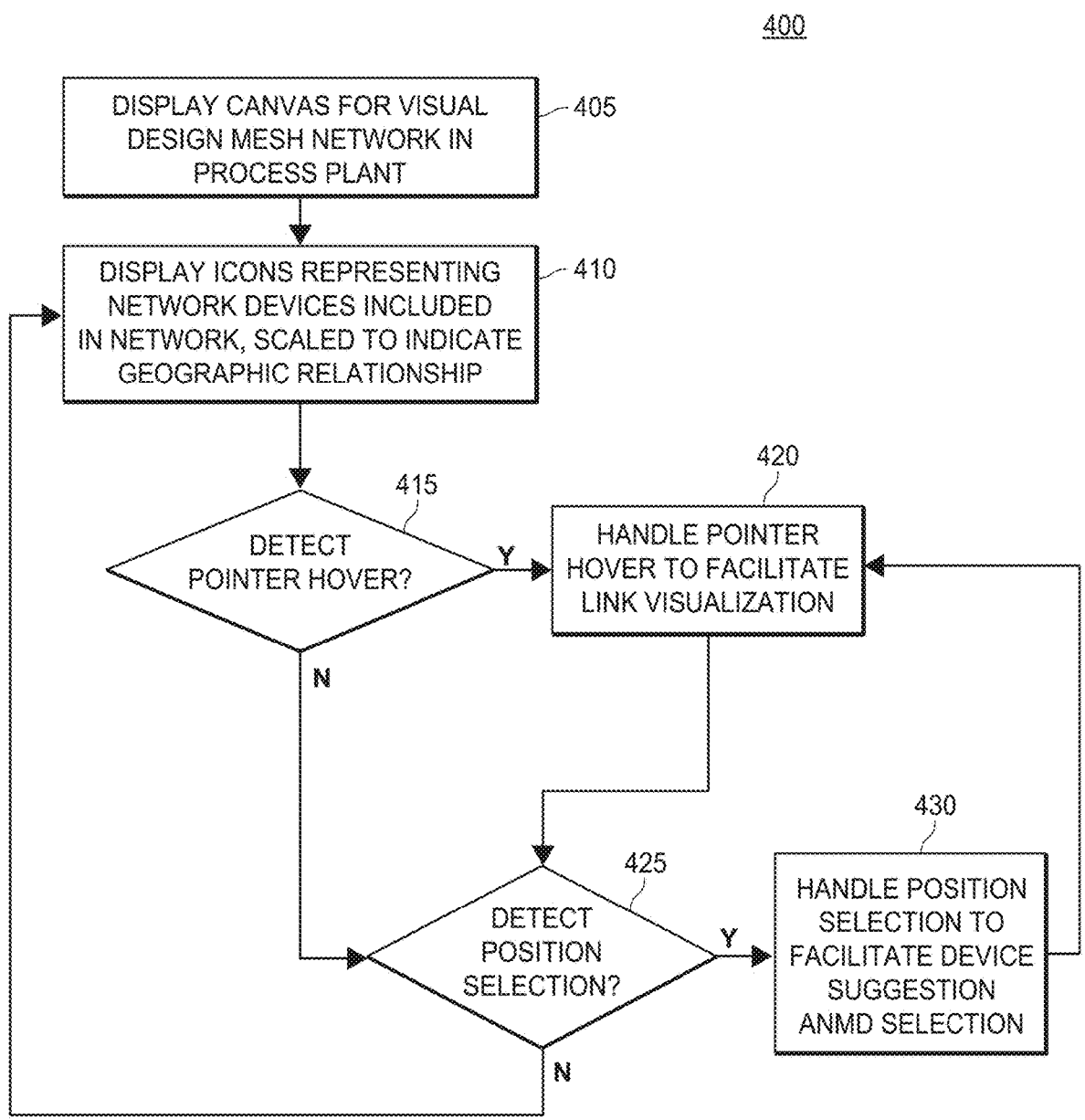
FIG. 4 depicts an example method for providing a user interface (e.g., via the network design tool) including a canvas that enables users to design network models of networks in process control environments by way of the users placing and arranging within the canvas symbols representing devices and links to be included in the networks.

FIG. 4 depicts an example method 400 for providing a user interface including a canvas that enables users to design network models of networks in process control environments by way of the users placing and arranging within the canvas symbols representing devices and links to be included in the networks. The method 400 may be implemented, in whole or in part, by the tool 45 shown in FIGS. 1 and 2. In an embodiment, the method 400 may be embodied by a set of instructions or routines that are stored to memory and executable by a processor to implement the functionality of the method 400. Any one or more of the devices 16, 18, 47, 41, or 55 shown in FIG. 1, for example, may implement the tool 45 and the method 400, depending on the embodiment.

At a step 405, the tool 45 displays a user interface ("UI") including a canvas, such as the canvas 382 shown in FIG. 3, on which a user can design a network model by placing symbols representing model network devices. The canvas may be displayed via any suitable electronic display.

At a step 410, the tool 45 displays icons or symbols representing model devices and links that have already been added to the network model. If a network model is being designed from scratch and currently includes no devices, the step 410 may be skipped.

At a step 415, the tool 45 determines whether or not it detects a hovering of a user input element, such as a cursor or pointer. A user may be considered to be "hovering" when she is interacting with the canvas (e.g., a mouse cursor or finger is detected on the canvas) without selecting a desired spot (e.g., without clicking on a spot, double tapping on a spot, etc.). The pointer may be an invisible element, such as when a touch input screen is utilized. In other words, in some instances, the tool 45 may detect touch input that does not represent a selection (e.g., the user is moving her finger around the screen without gesturing to indicate she has selected a desired position). If the user is detected "hovering" within the canvas, the tool 45 proceeds to a step 420. Otherwise, the tool 45 proceeds to a step 425.

At the step 420, the tool 45 dynamically displays one or more signal strength indications or visualizations representing one or more signal strengths for the devices already included in the network model. Example techniques for presenting such visualizations are discussed in more detail below with reference to FIG. 5.

At a step 425, the tool 45 determines whether or not it detects a selected position on the display canvas (e.g., via a mouse click, a double tap on a touch screen, etc.). If no position selection is detected, the tool 45 returns to the step 410. Otherwise, the tool 45 proceeds to a step 430.

At the step 430, the tool 45 may suggest a set of model devices to be placed at the selected position, and may place a selected model device on the canvas and automatically connect the new model device to one or more devices in the model network based on an analysis of the plant layout, the locations of the existing devices and the new device, and signaling attributes of the existing devices and new device. Example techniques for suggesting devices and automatically adding selected devices to a network model are described in more detail with reference to FIG. 7. After the step 430, the tool 45 may return to the step 410.

V. An Example Method for Visualizing Links

Figure 5:
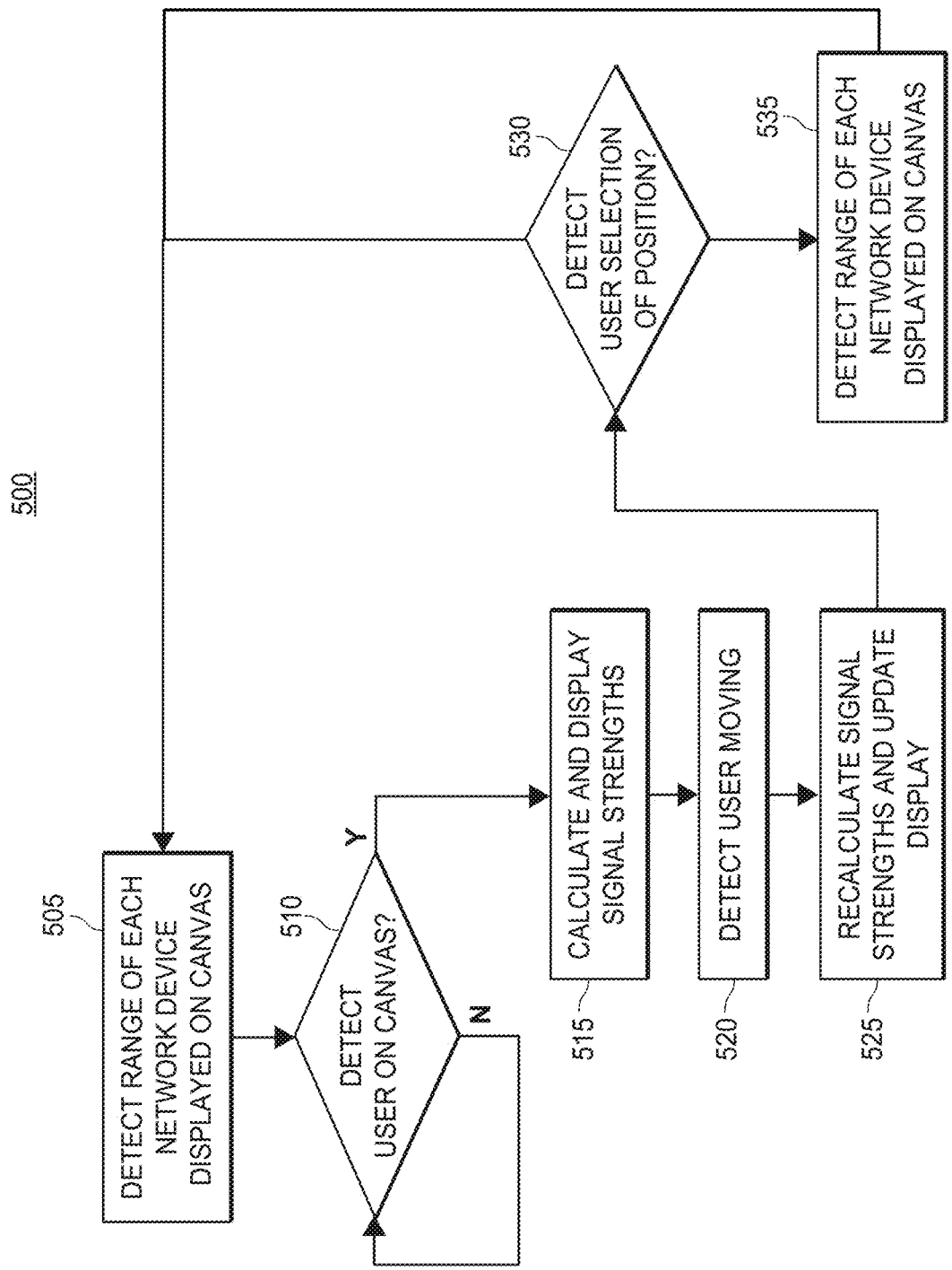
FIG. 5 depicts an example method for providing (e.g., via the network design tool), within a user interface for visually designing a model wireless network in a process control environment, indications or visualizations of link or signal strengths for model devices in the model network.

FIG. 5 depicts an example method 500 for providing, within a user interface for visually designing a model wireless network in a process control environment, indications or visualizations of link or signal strength for model devices in the model network. The method 500 may be implemented, in whole or in part, by the tool 45 shown in FIGS. 1 and 2. In an embodiment, the method 500 may be embodied by a set of instructions or routines that are stored to memory and executable by a processor to implement the functionality of the method 500. Any one or more of the devices 16, 18, 47, 41, or 55 shown in FIG. 1, for example, may implement the tool 45 and the method 500, depending on the embodiment Generally speaking, the method 500 is implemented after a user has begun designing a network model via the tool 45, and after one or more model devices have been added to the displayed canvas.

At a step 505, the tool 45 detects signaling attributes (e.g., range) of each network device displayed the canvas of the tool 45.

At a step 510, the tool 45 determines whether or not a pointer, cursor, or some other user interface element representing a user's position is detected on the canvas. In some instances (e.g., when the tool 45 is implemented via a touch display), the "pointer" may be invisible to the user. If the user is not detected, the tool 45 remains at the step 510 until a user is detected. If the user is detected, the tool 45 proceeds to a step 515.

At steps 515-525, the tool 45 dynamically displays one or more signal strength indications or visualizations representing signal strengths for potential links to model devices already placed on the canvas. Generally speaking, these indications indicate to the user the number and quality or strength of potential communication links at the user's current position. As the user moves, the signal strengths are recalculated and one or more visual properties of the displayed visualizations (e.g., color, spacing between dashes or dots, etc.) are updated accordingly to indicate the recalculated signal strengths, enabling the user to quickly move around the canvas and to evaluate the availability and quality of links at the user's position as he moves around the canvas. The visualizations may be updated instantaneously when certain thresholds are crossed, or gradually such that they appear to slowly change as the user moves across the canvas. In some embodiments, the tool 45 may alternatively or additionally dynamically update a visual indication of signal strength other than line, such as a textual indication graded according to any desired scale (e.g., 0-100, 0-10, A-F, etc.), a bar graph or set of bar graphs, etc.

More specifically, at the step 515, the tool 45 calculates the one or more signal strengths based on any one or more of: (i) a real-world position corresponding to the user's current canvas position, (ii) the real-world positions corresponding to the canvas positions of model devices currently included in the network model, (iii) distances between the real-world positions of the current devices and the real-world position of the user's current position, (iv) the layout of the environment between the various devices; and (v) signaling attributes of the model devices currently included in the network model. Example signaling attributes include signal strength, radiation patterns and/or sizes for which the relevant radios of modelled devices are configured (e.g., omnidirectional, bidirectional, unidirectional), etc. The tool 45 then displays visualizations or indications representing the calculated signal strengths.

At the step 520, the tool 45 detects the user moving to a new position on the canvas.

At a step 525, the tool 45 recalculates the signal strengths based on a new real-world position corresponding to the user's new canvas position and updates the displayed visualizations to reflect the recalculated signal strengths. The steps 515-525 may run continuously, enabling a dynamic display of signal strengths in real-time as the user moves around the canvas.

At a step 530, the tool 45 determines whether or not the user has selected a position as a desired position for a new device model (e.g., as opposed to simply hovering over the position). If a user selection of a position has been detected, the tool 45 proceeds to a step 535. Otherwise, it returns to the step 505.

At the step 535, the tool 45 may suggest model devices to be placed at the location, and the user may select one of the suggested model devices. An example method for handling device suggestion and selection is described in more detail below with reference to FIG. 7.

Figure 6:
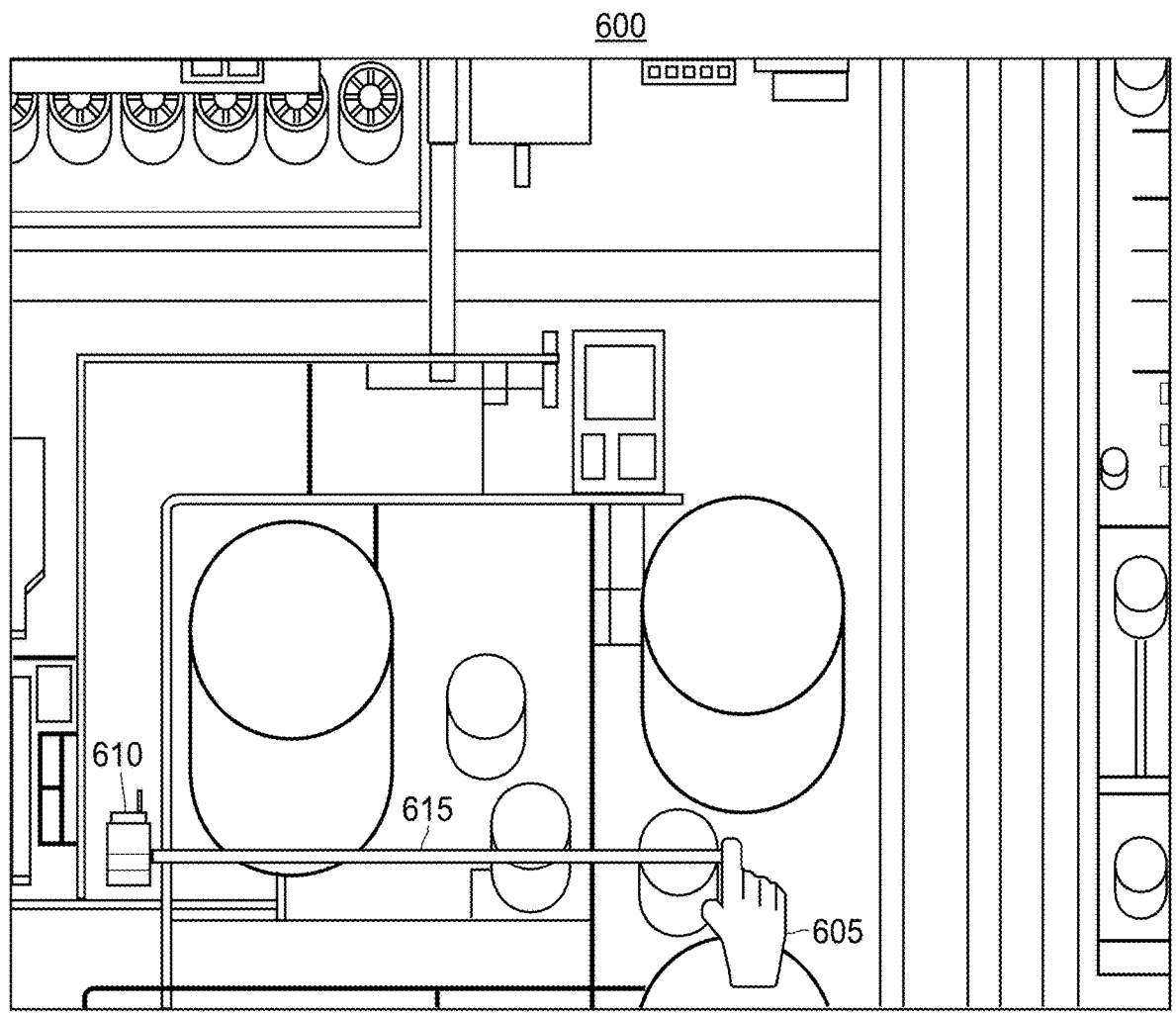
FIG. 6 depicts an example screenshot showing an example user interaction with a canvas that may be presented by the network design tool, wherein a link visualization is shown to indicate a strength of a potential link between (i) an existing model device in a network model and (ii) a current position of the user's pointer where a new model device might be added.

FIG. 6 is a screenshot depicting an example user interaction with a canvas 600 that may be presented by the tool 45, wherein a link visualization 615 is shown to indicate a strength of a potential link between a symbol 610 of an existing model device in a network model and a current position of the user's pointer 605 where a new model device might be added. As shown, the canvas depicts a layout of a process plant environment, giving a user an understanding of the layout and spatial relationship between various parts of the plant environment and any network devices that might be placed in the plant environment.

As shown, the visualization 615 may be a line having gradient coloring indicating signal strength at various points along the line (e.g., green to represent a strong signal and red to represent a weak signal). In some instances, rather than being colored according to a gradient, the line may be divided into multiple sections, each having a color or pattern indicating signal strength for that section (e.g., a green section for a strong signal, a yellow section for a mediocre signal, and a red section for a weak signal). In some instances, the line may terminate rather than extending all the way to the pointer 605 (e.g., indicating the maximum range of the signal). In some instances, the line may use spaced As the user moves the pointer 605, the link visualization 615 may update in real time to depict a signal strength according to the user's new position(s). For example, the visualization 610 may be a line that expands and contracts as the user moves, updates coloring and/or spacing between dashes and dots, etc.

VI. An Example Method for Suggesting and Adding New Devices

Figure 7:
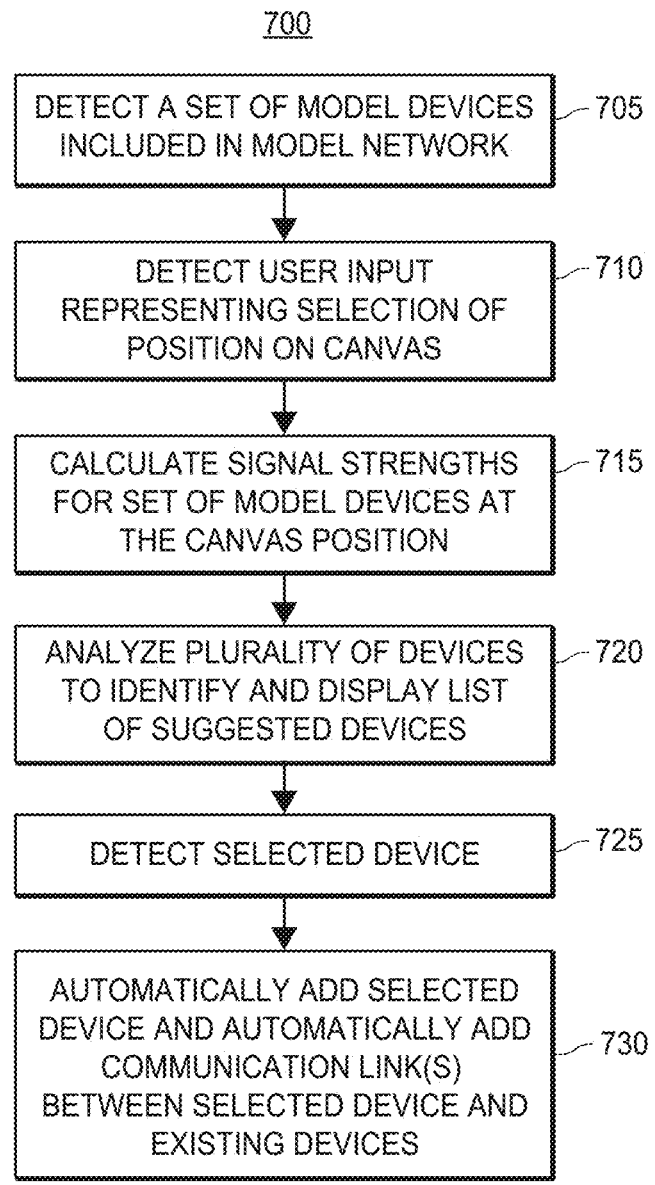
FIG. 7 depicts an example method for suggesting model devices to be added to a network model and for automatically connecting new model devices to other model devices included in the network model.

FIG. 7 depicts an example method 700 for suggesting model devices to be added to a network model and for automatically connecting new model devices to other devices included in the network model. The method 700 may be implemented, in whole or in part, by the tool 45 shown in FIGS. 1 and 2. In an embodiment, the method 700 may be embodied by a set of instructions or routines that are stored to memory and executable by a processor to implement the functionality of the method 700. Any one or more of the devices 16, 18, 47, 41, or 55 shown in FIG. 1, for example, may implement the tool 45 and the method 700, depending on the embodiment.

Generally speaking, the method 700 is implemented after a user has begun designing a network model via the tool 45, and after a number of model devices have been added to the displayed canvas.

At a step 705, the tool 45 detects a set of model devices included in the model network. The set of existing model devices may have been placed during the same session currently in progress, or may have been loaded from a file representing a saved model network that was designed during a previous session.

Figure 8:
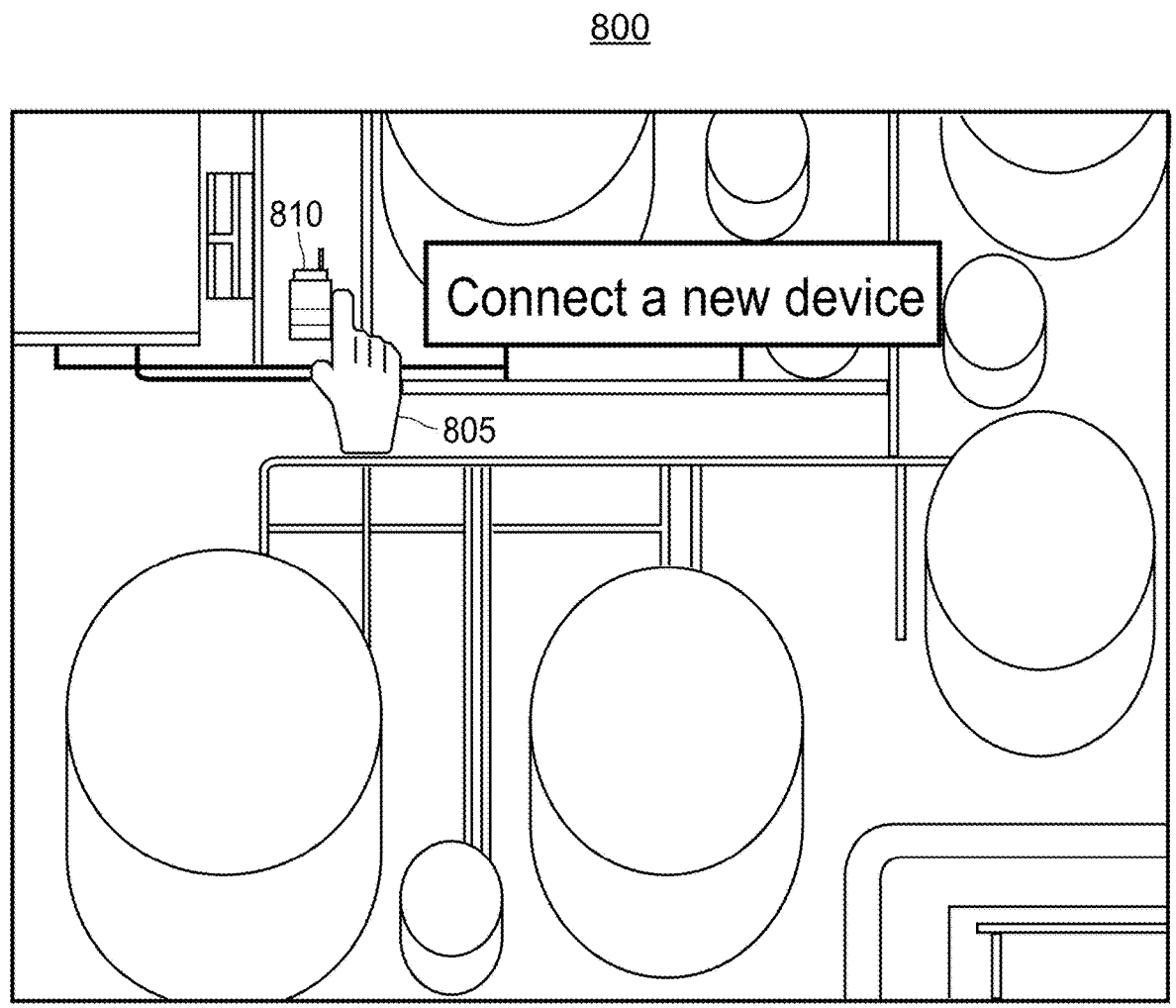
FIG. 8 depicts an example screenshot showing an example user interaction with a canvas that may be presented by the network design tool, wherein a user (represented by a pointer) selects a desired position for a new model device.

At a step 710, the tool 45 detects user input representing a selection of a position on the canvas. For example, FIG. 8 is a screenshot depicting an example user interaction with a canvas 800 that may be presented by the tool 45, wherein a user (represented by a pointer 805) selects a desired position 810 for a new model device. In some embodiments, the tool 45 may display a placeholder symbol for the new model device when the user selects the position 810 (e.g., which might change after the user selects a model device to add). In other embodiments, the tool 45 may only display a symbol representing a new device after the user has actually selected the model device (e.g., from a list of suggested devices).

Returning to FIG. 7, at a step 715, the tool 45 calculates signal strengths for the set of model devices at the selected canvas position. Generally speaking, this calculation is made by calculating distances between a real-world position corresponding to the selected canvas position and each of a number of real-world positions corresponding to the canvas positions of the model devices already included in the network model. In some instances, this calculated distance may account for a user-defined height for any one or more of the existing model devices and/or a user-defined height for the new device.

At a step 720, the tool 45 analyzes a plurality of potential model devices to identify and display a list of suggested model devices to be added to the model network represented on the canvas. The suggestions may be generated based on existing model devices, their signal attributes, their plant locations, their height(s), obstacles in the environment and the impact the obstacles might have on signal strength, signal attributes of the potential devices to be suggested, etc.

Figure 9:
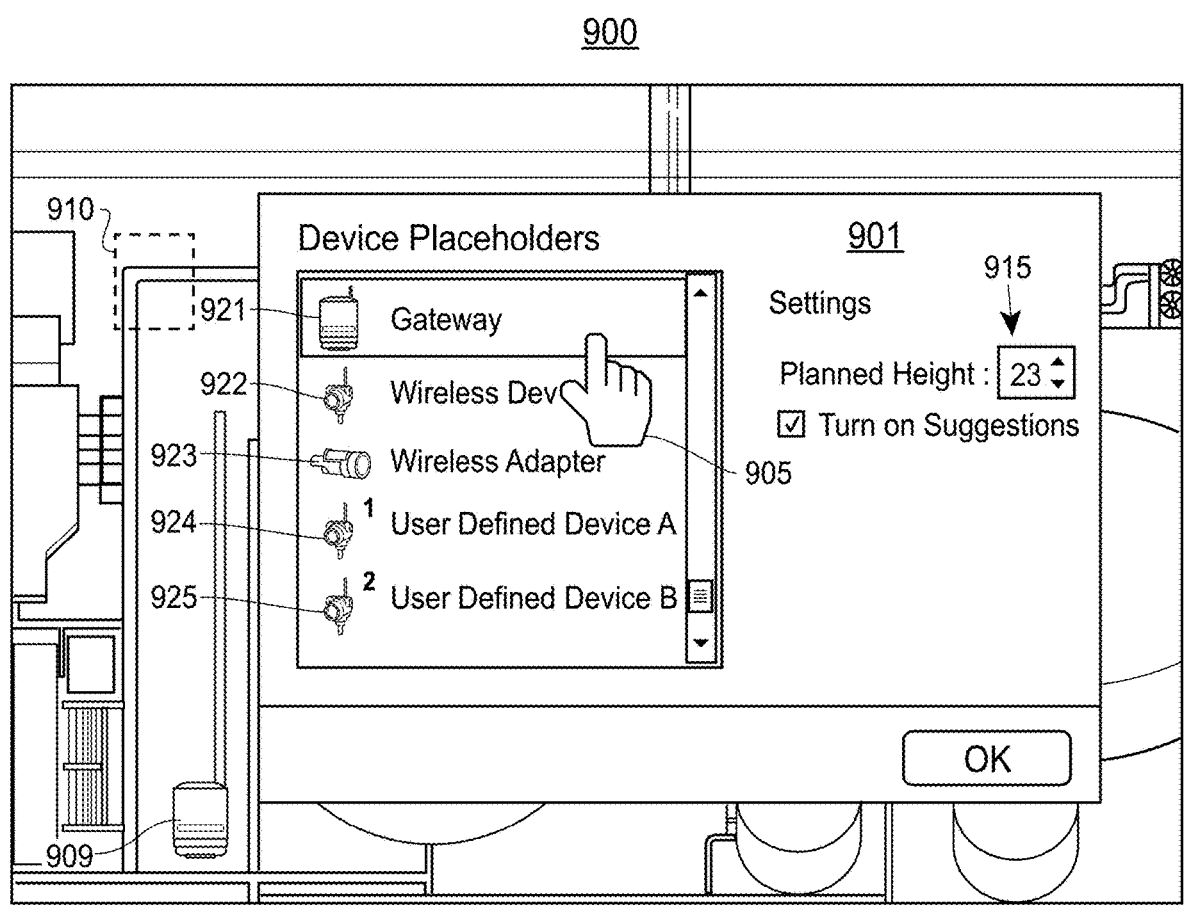
FIG. 9 depicts an example screenshot showing an example user interaction with a canvas that may be presented by the network design tool, wherein a user (represented by a pointer) selects a desired position for a new model device.

For example, FIG. 9 is a screenshot depicting an example user interaction with a canvas 900 that may be presented by the tool 45, wherein a user (represented by a pointer 905) selects a desired position 910 for a new model device. Prior to the user selecting the desired location 910, a model device 909 may already exist in the network model and may be shown on the canvas. In response to the user selecting the location 910, the tool 945 may display a window 901 including a set of suggested devices 915.

As noted with respect to the step 720, when the user selects the desired position 910, the tool 45 may calculate a signal strength for each of the existing model devices (e.g., the model device 909) at the location 910. Based on the signal strength of the model device 909 and the signaling attributes of potential model devices to be placed at the location 910, the tool 745 may select (from the potential model devices) a set of suggested model devices 921-925 to be placed at the location 910. In some embodiments, the user may select a desired height for the new device, which may impact the calculated distance between the planned position 910 for the new model device and the existing model device 909 (as well as any other existing model devices). In some embodiments, the tool 45 does not prompt the user for a desired height.

Returning to FIG. 7, at a step 725, the tool 45 detects a selection of a suggested model device by a user (e.g., one of the devices 921-925 shown in FIG. 9).

At a step 730, the tool 45 automatically adds a symbol representing the selected model device to canvas and automatically adds the model device to the model network by adding communication links between the selected model device and existing model devices in the model network. If the user has selected a position that is out of range for existing devices in the model network, the tool 45 may automatically add one or more intermediary nodes between the new device and the existing devices, and may establish link(s) to the network via these intermediary nodes. Further, if desired, the tool 45 may be configured to detect "pinch points" when a user adds a tool, wherein the new device is only within range of a single existing device in the model network. Generally speaking, pinch points represent a single point of failure. As a result, it may be desirable to avoid pinch points during the design phase. Accordingly, if the tool 45 detects a pinch point connection when the user adds a new model device to the network model, the tool 45 may establish a secondary one or more links to the existing model devices, which may involve adding intermediary nodes. The threshold for what is considered too weak of a signal may be user defined, or may be a default value.

Figure 10:
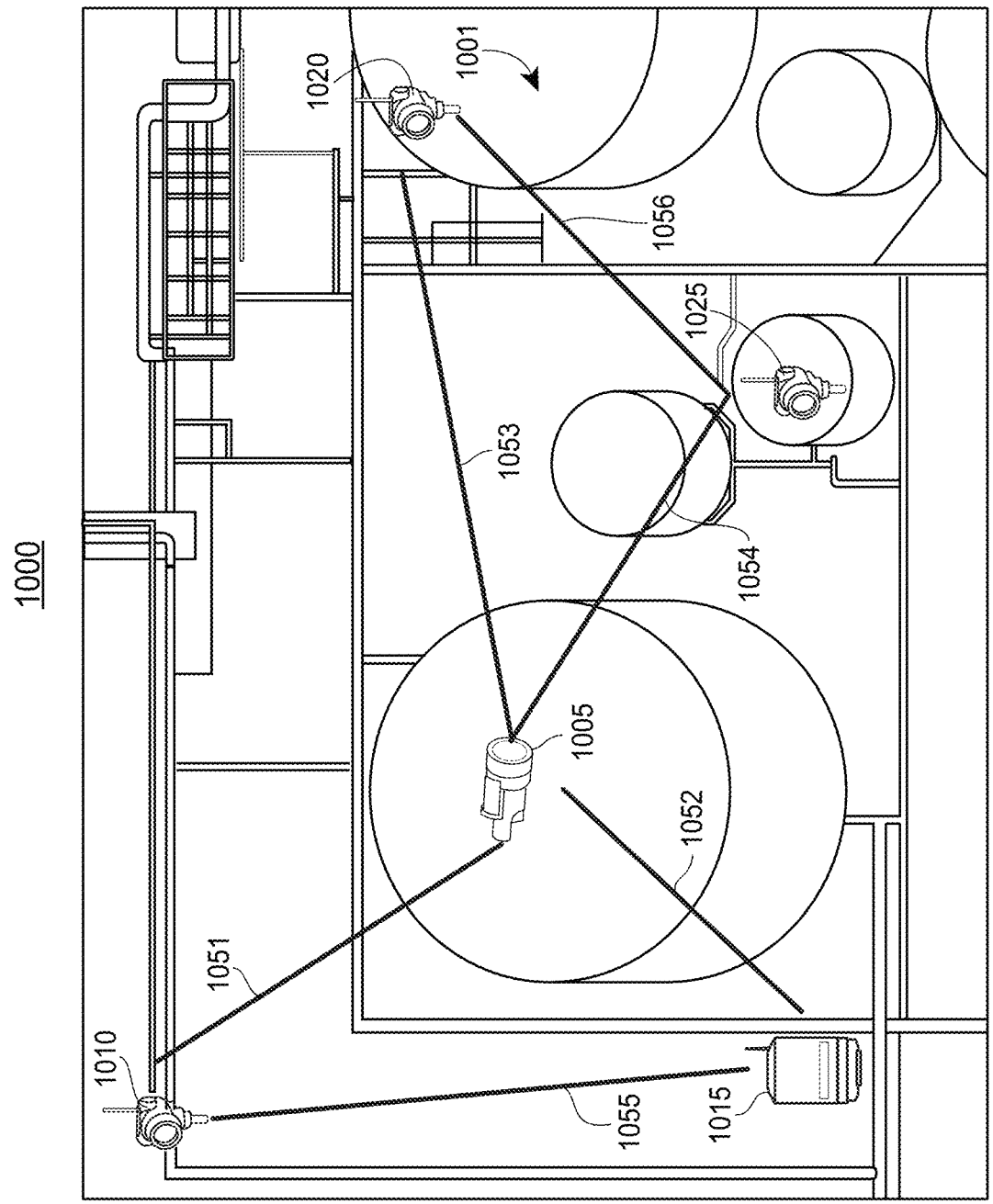
FIG. 10 depicts a screenshot showing an example user interaction with a canvas that may be presented by the network design tool.

For example, FIG. 10 is a screenshot depicting an example user interaction with a canvas 1000 that may be presented by the tool 45, including a network model 1001 that has been designed by a user via the tool 45. The network model includes devices 1005, 1010, 1015, 1020, and 1025. Further, the network model 1001 includes a link 1051 connecting the device 1005 to the device 1010; a link 1052 connecting the device 1005 to the device 1015; a link 1053 connecting the device 1005 to the device 1020; a link 1054 connecting the device 1005 to the device 1025; a link 1055 connecting the device 1010 to the device 1015; and a link 1056 connecting the device 1020 to the device 1025.

In an example operation, the device 1025 may have been the last model device added to the network model 1001, and the tool 45 may have automatically connected to the devices 1005 and 1020 (and not the devices 1015 and 1010) based on an analysis of the plant environment, the locations of the existing model devices 1005-1020; the signaling attributes of the existing model devices 1005-1020, the signal attributes of the new device 1025, the heights of any one or more of the model device 1005-1025; etc.

VII. Additional Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, the phrase "wherein the system includes at least one of X, Y, or Z" means the system includes an X, a Y, a Z, or some combination thereof. Similarly, the phrase "wherein the component is configured for X, Y, or Z" means that the component is configured for X, configured for Y, configured for Z, or configured for some combination of X, Y, and Z.

In addition, use of the "a" or "an" are employed to describe elements and components of the embodiments herein. This description, and the claims that follow, should be read to include one or at least one. The singular also includes the plural unless it is obvious that it is meant otherwise.

Further, the patent claims at the end of this document are not intended to be construed under 35 U.S.C. § 112(f) unless traditional means-plus-function language is expressly recited, such as "means for" or "step for" language being explicitly recited in the claim(s). At least some aspects of the systems and methods described herein are directed to an improvement to computer functionality, and improve the functioning of conventional computers.

As used herein, when used in the context of system(s) or device(s) that communicate information or data, the term "network" refers to a collection of nodes (e.g., devices or systems capable of sending, receiving or forwarding information) and links which are connected to enable telecommunication between the nodes.

Depending on the embodiment (and unless otherwise stated), each of the described networks may include dedicated routers, switches, or hubs responsible for forwarding directing traffic between nodes, and, optionally, dedicated devices responsible for configuring and managing the network. Some or all of the nodes in the described networks may be also adapted to function as routers in order to direct traffic sent between other network devices. Nodes of the described networks may be inter-connected in a wired or wireless manner, and may have different routing and transfer capabilities.

Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Unless otherwise stated, a "communication link" or a "link" is a pathway or medium connecting two or more nodes. A link may be a physical link or a logical link. A physical link is the interface or medium(s) over which information is transferred, and may be wired or wireless in nature. Example physicals links include (i) wired links such as cables with a conductor for transmission of electrical energy or a fiber optic connection for transmission of light and (ii) wireless links such as wireless electromagnetic signals that carry information via changes made to one or more properties of electromagnetic waves. A wireless link may be a wireless electromagnetic signal that carries information via changes made to one or more properties of an electromagnetic wave(s). A wireless electromagnetic signal may be a microwave or radio wave and may be referred to as a radio frequency or "RF" signal.

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

As used herein the phrase "memory" or "memory device" refers to a system or device including computer-readable media or medium ("CRM"). "CRM" refers to a medium or media accessible by the relevant computing system for placing, keeping, or retrieving information (e.g., data, computer-readable instructions, program modules, applications, routines, etc). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

The various operations of example methods (e.g., the methods 400, 500, and 700) described herein may be performed, at least partially, by one or more described or implicitly disclosed controllers or processors. Generally speaking, the terms "processor" and "microprocessor" are used interchangeably, each referring to a computer processor configured to fetch and execute instructions stored to memory.

By executing these instructions, the disclosed processor(s) can carry out various operations or functions defined by the instructions. The disclosed processor(s) may be temporarily configured (e.g., by instructions or software) or permanently configured to perform the relevant operations or functions (e.g., a processor for an Application Specific Integrated Circuit, or ASIC), depending on the particular embodiment. Each disclosed processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. For example, when a single processor is described as performing a set of operations, it is understood that multiple processors may perform the set of operations in some embodiments according to any desired distribution across the multiple processors. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Unless otherwise noted, a "routine," "module," or "application" described in this disclosure refers to a set of computer-readable instructions that may be stored on a CRM. For example, the tool 45 may be a routine that is stored on a CRM. Generally, a CRM stores computer-readable code ("code") representing or corresponding to the instructions, and the code is adapted to be executed by a processor to facilitate the functions described as being represented by or associated with the routine or application. Each routine or application may be implemented via a stand-alone executable file, a suite or bundle of executable files, one or more non-executable files utilized by an executable file or program, or some combination thereof. In some instances, unless otherwise stated, one or more of the described routines may be hard-coded into one or more EPROMs, EEPROMs, application specific integrated circuits (ASICs), field programmable gate arrays (FPGAs), or any other hardware or firmware elements.

What is claimed is:

1. A method for facilitating visual design of a network in a process control environment, the method comprising:
   displaying a canvas configured to enable users to design network models of networks in process control environments by way of the users placing and arranging within the canvas symbols representing devices and links to be included in the networks;
   detecting a set of device symbols on the canvas representing a set of model devices included in a network model;
   detecting a selection of a canvas position on the canvas;
   calculating one or more signal strengths, at a real-world position corresponding to the canvas position, for the set of model devices based on an analysis of: (i) the real-world position corresponding to the canvas position; (ii) real-world positions of each model device included in the set of model devices included in the network; and (iii) wireless signaling attributes of each device included in the set of model devices include in the network; and
   generating and displaying a user selectable list of suggested model devices, selected from a plurality of potential model devices, to be placed at the canvas position and added to the network model, wherein the user selectable list is generated based on: (i) the calculated one or more signal strengths at the real-world position; and (ii) wireless signaling attributes of the plurality of potential devices.

2. The method of claim 1, further comprising:
   detecting a selection of a selected model device from the user selectable list;
   responding to detecting the selection by adding a device symbol representing the selected model device to the canvas at the canvas position; and
   generating the network model based on symbols included on the canvas such that the network model includes the selected model device.

3. The method of claim 2, further comprising:
   analyzing the one or more signal strengths to select one or more model devices from the set of model devices included in the network model that have the strongest signal strengths;
   automatically adding to the canvas one or more link symbols representing one or more links between: (i) the selected model device, and (ii) the one or more model devices selected from the set of model devices that have the strongest signal strengths at the real-world position;
   wherein generating the network model based on the symbols included on the canvas includes generating the network model such that the network model includes the one or more links between: (i) the selected model device, and (ii) the one or more model devices selected from the set of model devices that have the strongest signal strengths at the real-world position.

4. The method of claim 3, further including:
   detecting that the signal strengths for the selected one or more model devices are below a threshold;
   in response to detecting that the signal strengths are below the threshold, automatically adding to the canvas an intermediary device symbol representing an intermediary device;
   wherein automatically adding to the canvas the one or more link symbols comprises adding (i) a first link symbol between the device symbol representing the selected model device and the intermediary device symbol, and (ii) a second link symbol between the intermediary device symbol and the set of device symbols that were on the canvas before the device symbol representing the selected device was added;
   wherein generating the network model includes generating the network model such that the network model includes (i) the model intermediary device and (ii) first and second links corresponding to the first and second link symbols.

5. The method of claim 1, wherein calculating the one or more signal strengths comprises: (i) receiving a user-defined height of for the selected model device; and (ii) calculating one or more distances between the real-world position corresponding to the canvas position and the real-world positions of each model device in the set of model devices in a manner that accounts for the user-defined height.

6. The method of claim 5, further including receiving one or more desired heights of the model devices in the set of model devices.

7. The method of claim 1, wherein calculating the one or more signal strengths comprises calculating the one or more signal strengths based on a default height for the model device.

8. The method of claim 1, further including detecting, based on said calculating of the one or more signal strengths, that the real-world position corresponding to the canvas position is out of range of the set of model devices;
   wherein generating and displaying the user selectable list of suggested model devices comprises responding to said detecting that the real-world position is out of range by generating and displaying a model repeater in the user selectable list of suggested model devices.

9. A system for facilitating visual design of a network in a process control environment, the method system comprising:
   a user interface including a display and a user input component; and
   one or more processors coupled to the user interface and configured to:
      display, via the display, a canvas configured to enable users to design mesh network models of mesh networks in process control environments by way of the users placing and arranging within the canvas symbols representing network devices and links to be included in the mesh networks;
      detect a set of device symbols on the canvas representing devices included in a mesh network model;
      detect, via the user input component, a selection of a canvas position on the canvas;
      calculate one or more signal strengths, at a real-world position corresponding to the canvas position, for the set of devices based on an analysis of: (i) the real-world position corresponding to the canvas position; (ii) real-world positions of each device included in the set of devices included in the mesh network; and (iii) wireless signaling attributes of each device included in the set of devices include in the mesh network; and generate and display, via the display, a user selectable list of suggested devices, selected from a plurality of potential devices, to be placed at the canvas position and added to the mesh network model, wherein the user selectable list is generated based on:
(i) the calculated one or more signal strengths at the real-world position; and (ii) wireless signaling attributes of the plurality of potential devices.

10. The system of claim 9, further comprising:
detecting a selection of a selected model device from the user selectable list;
responding to detecting the selection by adding a device symbol representing the selected model device to the canvas at the canvas position; and
generating the network model based on symbols included on the canvas such that the network model includes the selected model device.

11. The system of claim 10, further comprising:
analyzing the one or more signal strengths to select one or more model devices from the set of model devices included in the network model that have the strongest signal strengths;
automatically adding to the canvas one or more link symbols representing one or more links between: (i) the selected model device, and (ii) the one or more model devices selected from the set of model devices that have the strongest signal strengths at the real-world position;
wherein generating the network model based on the symbols included on the canvas includes generating the network model such that the network model includes the one or more links between: (i) the selected model device, and (ii) the one or more model devices selected from the set of model devices that have the strongest signal strengths at the real-world position.

12. The system of claim 11, further including:
detecting that the signal strengths for the selected one or more model devices are below a threshold;
in response to detecting that the signal strengths are below the threshold, automatically adding to the canvas an intermediary device symbol representing a model repeater;
wherein automatically adding to the canvas the one or more link symbols comprises adding (i) a first link symbol between the device symbol representing the selected model device and the intermediary device symbol, and (ii) a second link symbol between the intermediary device symbol and the set of device symbols that were on the canvas before the device symbol representing the selected device was added;
wherein generating the network model includes generating the network model such that the network model includes (i) the model repeater and (ii) first and second links corresponding to the first and second link symbols.

13. The system of claim 9, wherein calculating the one or more signal strengths comprises: (i) receiving a user-defined height of for the selected model device; and (ii) calculating one or more distances between the real-world position corresponding to the canvas position and the real-world positions of each model device in the set of model devices in a manner that accounts for the user-defined height.

14. The system of claim 13, further including receiving one or more desired heights of the model devices in the set of model devices.

15. The system of claim 9, wherein calculating the one or more signal strengths comprises calculating the one or more signal strengths based on a default height for the model device.

16. The system of claim 9, further including detecting, based on said calculating of the one or more signal strengths, that the real-world position corresponding to the canvas position is out of range of the set of model devices;
wherein generating and displaying the user selectable list of suggested model devices comprises responding to said detecting that the real-world position is out of range by generating and displaying a model repeater in the user selectable list of suggested model devices.

17. A method for dynamically visualizing potential communication links in a user interface for designing a network in a process control environment, the method comprising:
displaying a canvas configured to enable users to design network models of networks in process control environments by way of the users placing and arranging within the canvas symbols representing network devices and links to be included in the networks;
detecting a set of device symbols on the canvas representing devices included in a mesh network model;
detecting a pointer, representing a position of a user, at a first canvas position on the canvas; and
dynamically displaying one or more signal strength indications representing one or more signal strengths for the set of devices relative to the pointer, including:
(i) calculating the one or more signal strengths, at a first real-world position corresponding to the first canvas position, for the set of devices;
(ii) displaying the one or more signal strength indications such that they possess a first property representing the one or more signal strengths at the first real-world position;
(iii) detecting the pointer moving from the first canvas position to a second canvas position;
(iv) responding to detecting the user pointer element moving by recalculating the one or more signal strengths at a second-real world position corresponding to the second canvas position; and
(v) updating the one or more signal strength indications to indicate the recalculated one or more signal strength, wherein the updated one or more signal strength indications possess a second property representing the recalculated one or more signal strengths at the second real-world position.

18. The method of claim 17, wherein the one or more signal strength indicators are lines representing one or more signals for the set of devices.

19. The method of claim 18, wherein the first property is a first color and wherein the second property is a second color.

20. The method of claim 19, wherein updating the one or more signal strength indicators comprises gradually changing the one or more signal strength indicators from the first color to the second color as the point moves from the first canvas position to the second canvas position.

21. The method of claim 19, wherein updating the one or more signal strength indicators comprises instantaneously changing the one or more signal strength indicators from the first color to the second color when a threshold distance between the first canvas position and the second canvas position is exceeded.

22. The method of claim 19, wherein each of the one or more signal strength indicators has gradient coloring indicating signal strength at multiple points along the signal strength indicator, such that the first color represents a first signal strength and the second color represents a second signal strength that is weaker than the first signal strength.

23. The method of claim 18, wherein the one or more signal strength indicators are dotted or dashed, and wherein the first property represents a first spacing between the dashes or dots and the second property represents a second spacing greater than the first spacing.

24. The method of claim 17, wherein each of the one or more signal strength indicators is bar graph representing a signal strength for a device to which it corresponds.

25. The method of claim 17, further comprising: receiving from the user a desired height of a next device to be placed on the canvas; and wherein said calculating comprises: calculating the one or more signal strengths at the first real-world position based on an analysis of: (i) one or more distances between the first real-world position corresponding to the canvas position and the real-world positions of each device included in the set of devices, wherein the one or more distances are calculated; and (ii) wireless signaling attributes of each device included in the set of devices included in the network.

26. The method of claim 17, wherein the pointer is an invisible user interface element representing the position of the user.

27. The method of claim 26, wherein displaying the canvas comprises displaying the canvas via a touch screen.

28. A system for dynamically visualizing potential communication links in a user interface for designing a network in a process control environment, the system comprising:

a user interface including a display and a user input component; and one or more processors coupled to the user interface and configured to:

display, via the display, a canvas configured to enable users to design network models of networks in process control environments by way of the users placing and arranging within the canvas symbols representing network devices and links to be included in the networks;

detect a set of device symbols on the canvas representing devices included in a mesh network model;

detect, via the user input component, a pointer representing a position of a user at a first canvas position on the canvas; and dynamically display, via the display, one or more signal strength indications representing one or more signal strengths for the set of devices relative to the pointer, including:

(i) calculate the one or more signal strengths, at a first real-world position corresponding to the first canvas position, for the set of devices;

(ii) display the one or more signal strength indications such that they possess a first property representing the one or more signal strengths at the first real-world position;

(iii) detect the pointer moving from the first canvas position to a second canvas position;

(iv) respond to detecting the user pointer element moving by recalculating the one or more signal strengths at a second-real world position corresponding to the second canvas position; and (v) update the one or more signal strength indications to indicate the recalculated one or more signal strength, wherein the updated one or more signal strength indications possess a second property representing the recalculated one or more signal strengths at the second real-world position.

29. The system of claim 28, wherein the one or more signal strength indicators are lines representing one or more signals for the set of devices.

30. The system of claim 29, wherein the first property is a first color and wherein the second property is a second color.

31. The system of claim 30, wherein updating the one or more signal strength indicators comprises gradually changing the one or more signal strength indicators from the first color to the second color as the point moves from the first canvas position to the second canvas position.

32. The system of claim 29, wherein updating the one or more signal strength indicators comprises instantaneously changing the one or more signal strength indicators from the first color to the second color when a threshold distance between the first canvas position and the second canvas position is exceeded.

33. The system of claim 29, wherein each of the one or more signal strength indicators has gradient coloring indicating signal strength at multiple points along the signal strength indicator, such that the first color represents a first signal strength and the second color represents a second signal strength that is weaker than the first signal strength.

34. The system of claim 29, wherein the one or more signal strength indicators are dotted or dashed, and wherein the first property represents a first spacing between the dashes or dots and the second property represents a second spacing greater than the first spacing.

35. The system of claim 28, wherein each of the one or more signal strength indicators is bar graph representing a signal strength for a device to which it corresponds.

36. The system of claim 28, wherein the one or more processors are further configured to receive, via the user input component, a desired height of a next device to be placed on the canvas; and wherein recalculating the one or more signal strengths at the second-real world position corresponding to the second canvas position includes: (i) calculating one or more distances between the second real-world position and the real-world positions of the devices in the set of devices; (ii) analyzing wireless signaling attributes of each device included in the set of devices included in the network; and (iii) recalculating the one or more signal strengths based on the one or more distances and the wireless signal attributes.

37. The system of claim 18, wherein the pointer is an invisible user interface element representing the position of the user.

38. The system of claim 37, wherein the display is a touch screen.

* * * * *